US005893058A

United States Patent [19]

Kosaka

[11] Patent Number: 5,893,058

[45] Date of Patent: Apr. 6, 1999

[54] SPEECH RECOGNITION METHOD AND APPARATUS FOR RECOGNIZING PHONEMES USING A PLURALITY OF SPEECH ANALYZING AND RECOGNIZING METHODS FOR EACH KIND OF PHONEME

[75] Inventor: Tetsuo Kosaka, Yokohama, Japan

[73] Assignee: Canon Kabushiki Kaisha, Tokyo, Japan

[21] Appl. No.: 340,468

[22] Filed: Nov. 14, 1994

Related U.S. Application Data

[63] Continuation of Ser. No. 32,198, Mar. 15, 1993, abandoned, which is a continuation of Ser. No. 469,067, Jan. 23, 1990, abandoned.

[30] Foreign Application Priority Data

Jan. 24, 1989 [JP] Japan ..................................... 1-13098

[51] Int. Cl.$^{6}$ ........................................................ G10L 5/00

[52] U.S. Cl. .......................... 704/254; 704/252; 704/236; 704/238

[58] Field of Search ......................... 381/41–47; 395/2.4, 395/2.43, 2.45–2.49, 2.6, 2.63, 2.61

[56] References Cited

U.S. PATENT DOCUMENTS

| | | | |
|---|---|---|---|
| 3,688,267 | 8/1972 | Iijima et al. | 340/146 |
| 4,509,186 | 4/1985 | Omura et al. | 395/2.4 |
| 4,590,605 | 5/1986 | Hataoka et al. | 381/43 |
| 4,624,010 | 11/1986 | Takebayashi | 381/43 |
| 4,625,287 | 11/1986 | Matsuura et al. | 381/43 |
| 4,736,429 | 4/1988 | Niyada et al. | 381/43 |
| 4,817,159 | 3/1989 | Hoshimi et al. | 381/43 |
| 4,852,170 | 7/1989 | Bordeaux | 395/2.86 |
| 4,852,181 | 7/1989 | Morito et al. | 381/46 |
| 4,856,067 | 8/1989 | Yamada et al. | 381/43 |

FOREIGN PATENT DOCUMENTS 0085543 8/1983 European Pat. Off. .

OTHER PUBLICATIONS

Harris Drucker, "Speech Processing in a High Ambient Noise Environment," IEEE Trans. Audio and Electroacoustics AU–16(2), Jun. 1968.

ICASSP 86 IEEE–IECEJ–ASJ International Conference On Acoustics, Speech, and Signal Processing, "Top–Down Controlled and Optimal Syllable–Template Chaining Algorithm For Large Vocabulary Speech Recognition", S. Kabasawa, et al., vol. 3, Apr. 7–11, 1986, pp. 2303–2306, New York.

AIP Conference Proceedings, Neural Network For Computing, "Hopfield Model Applied to Vowel and Consonant Discrim.", B. Gold, 1986, pp. 158–164, American Institute of Physics, New York.

ICASSP 87, 1987 International Conference On Acoustics, Speech, and Signal Proceeding, "A Telephone Speech Recogn. System Using Word Spotting Tech. Based on Stat. Measure", T. Kimura, et al., vol. 2, pp. 1175–1178, New York.

(List continued on next page.)

*Primary Examiner*—David R. Hudspeth
*Assistant Examiner*—Donald L. Storm
*Attorney, Agent, or Firm*—Fitzpatrick, Cella, Harper & Scinto

[57] ABSTRACT

A method and apparatus for recognizing speech employing a word dictionary in which the phoneme of words are stored and for recognizing speech based on the recognition of the phonemes. The method and apparatus recognize phonemes and produce data associated with each phoneme according to different speech analyzing and recognizing methods for each kind of phoneme, normalize the produced data, and match the recognized phonemes with words in the word dictionary by means of dynamic programming based on the normalized data.

15 Claims, 24 Drawing Sheets

OTHER PUBLICATIONS

Kyoritsu Publishing, "Speech Recognition", Y. Niimi, pp. 81–87, Jul. 1979.

Society for Electrical Information Communication, "Speech Recognition With Probability Model," S. Nakagawa, pp. 156–177, Jul. 1988.

Journal of Electro–Communication, "Word Speech Recognition By DP Matching Using Maharanobis Distance", Jan. 1983, vol. J66–A, No. 1, pp. 64–70.

Japanese Acoustics Society, "Detection of the Characteristics of Segment Aiming At The Recognition of Cont. Speech", Dec. 1985, pp. 405–412.

$S(x) = \begin{cases} x, & x \geq 0 \\ 0, & x < 0 \end{cases}$ $F_{23avg}$: $F_3 - F_2$ AVERAGE VALUE OF $F_3 - F_2$ $\Theta_T$ = 35ms, $\Theta_1$ :DEPENDING ON SPEAKERS $\Theta_2$ =300 Hz, $\Theta_3$ = 800Hz, $\Theta_4$ =3000Hz, $\Theta_5$ =400 Hz,

EIGENVALUES FOR
MAIN COMPONENTS

DETECTION METHOD FOR SEGMENT TYPE FEATURES

DETECTION EXAMPLES OF SEGMENT TYPE FEATURES

SPEECH RECOGNITION METHOD AND APPARATUS FOR RECOGNIZING PHONEMES USING A PLURALITY OF SPEECH ANALYZING AND RECOGNIZING METHODS FOR EACH KIND OF PHONEME

This application is a continuation of application Ser. No. 08/032,198 filed Mar. 15, 1993, now abandoned, which is a continuation of application Ser. No. 07/469,067, filed Jan. 23, 1990, now abandoned.

BACKGROUND OF THE INVENTION

1. Field of the Invention

The present invention relates to a method and apparatus for speech recognition which performs recognition of the speech of an unspecified speaker by referring to a word dictionary in which the phonemes of words are stored.

2. Description of the Related Art

Recently, techniques using phonemes or syllables as a unit have been investigated in speech recognition apparatus. Such techniques depend on the following considerations.

In a speech recognition apparatus targeting large vocabularies, a large memory capacity is required to store the standard patterns for every word. In addition, much labor is required to register these words and it becomes difficult to append new words. In contrast, the method using phonemes and the like as a basic unit for recognition eliminates these problems, since the words written in Roman characters (romaji) or in Japanese syllables (kana) can be stored in a dictionary.

However, since there are variations in the spoken phoneme spectrum, combinations of intonations and difficult to recognize phonemes, such as plosives, speech recognition is not easy. Furthermore, individual differences also affect speech recognition when the speech of unspecified speakers is to be recognized, making it even more difficult.

Therefore, the following techniques have been investigated to deal with these problems:

(1) learning vowels;

(2) the statistical discrimination method;

(3) the hidden Markov model; and (4) the multi-template method.

However, since each phoneme in Japanese differs from every other in the appearance of phonemes by groups of phonemes, speech is difficult to recognize based upon a uniform method.

For example, vowels are characterized by the relative position of the formant, semivowels, plosives and so on; each of these, in turn, are characterized by a characteristic change in the spectrum over time. Furthermore, although certain changes in the spectrum are characteristic of each semivowel and plosive, there are differences in that the spectrum changes relatively slowly for semivowels. In contrast, the spectrum rapidly changes in a short time for plosives.

In recognizing these differently characterized phonemes, these techniques are defective in that a high recognition rate cannot be obtained because all the phonemes are recognized uniformly using one of the above described methods of the conventional apparatuses. For example, detection of the characteristics of segments aimed at the recognition of continuous speech (Kosaka, et al., Japanese Acoustics Society, Voice Section, S85-53, December 1985) can be cited as the method belonging to the aforementioned method (2). However, although the recognition rates for plosives and so on are high because this method is devised so as to correspond to the changes of the spectrum in time, this method is not suitable for recognizing phonemes, such as semivowels whose spectrum slowly changes and whose time structure changes, because it does not cope with the variation of the change of the spectrum with respect to time.

In addition, there are systems which perform phoneme recognition on each rough classified group by methods different from each other after rough segmentation, like a system devised at MIT Lincoln Institute (ref. Yasunaga Niimi, Speech Recognition, pp. 81–87, Kyoritsu Publishing, October 1979). However, there is a defect that the segmentation is greatly loaded in such a system and the recognition rate greatly depends on the quality of the segmentation.

SUMMARY OF THE INVENTION

The present invention is designed to solve the above-described problems. Specifically, an object of this invention is to provide a method and apparatus for speech recognition which can eliminate the difficulty in recognizing the speech of an unspecified speaker and has high recognition accuracy.

Other objects of this invention will be clarified from the following detailed explanation and the figures.

BRIEF DESCRIPTION OF THE DRAWINGS

FIG. 13*a* shows the erroneous recognition score and FIG. 13*b* shows the number of times of learning until convergence;

FIG. 14*a* shows the case in which learning was made by applying labels of nine syllables to the output units, FIG. 14*b* shows the case of applying labels to three vowels, and FIG. 14*c* shows the case of applying labels to three consonants;

DESCRIPTION OF THE PREFERRED EMBODIMENT

An embodiment of the present invention will be explained in detail as follows with reference to the attached figures.

Figure 1A:
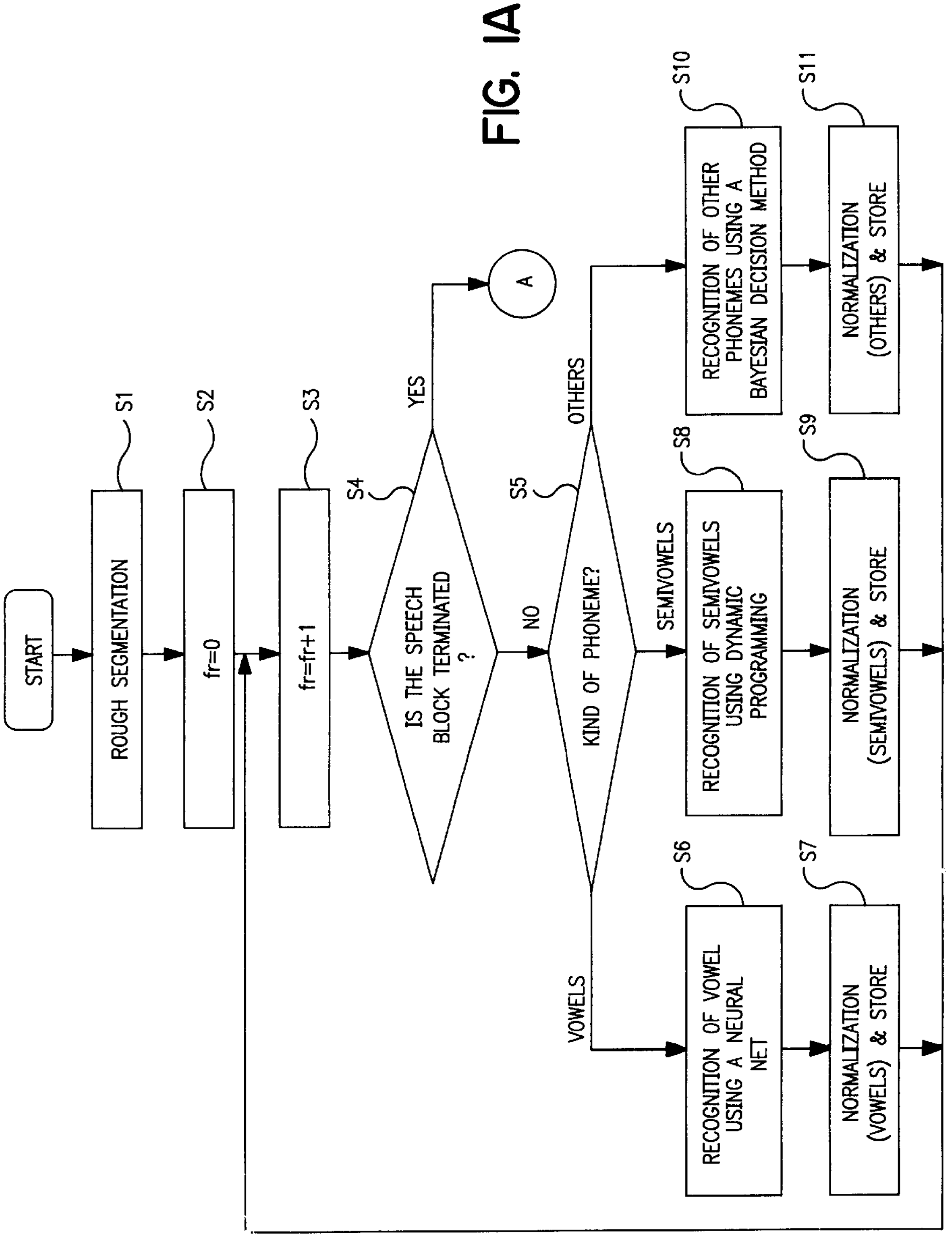
FIGS. 1A and 1B are flowcharts showing a processing procedure of speech recognition in accordance with the present invention.
Figure 1B:
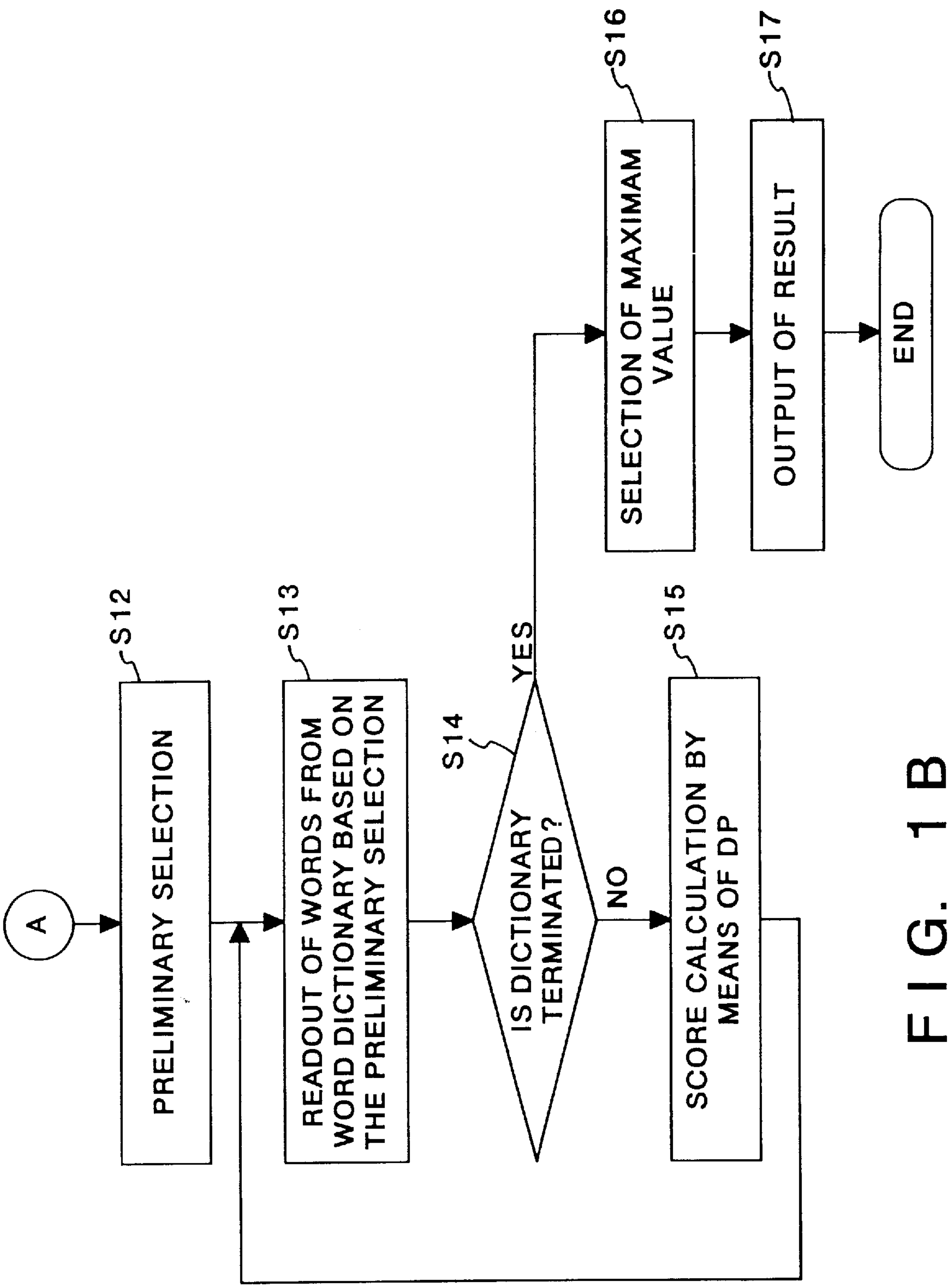

FIGS. 1A and 1B are flowcharts which most clearly show an operation of this apparatus. These figures show processing steps after a word is uttered and analyzed. The syllabic nasal /N/ is included in the vowels in this embodiment.

At first, in step S1, a speech block is classified into several groups of phonemes using all the parameter time series of the input words. The number of groups of phonemes into which a speech block is classified depends on how many kinds of recognition systems for the phonemes described below are prepared. In this embodiment, a speech block is classified into three kinds of classes, that is, a vowel, a semivowel, and others.

Its classification is described in "Speech Recognition" (Yasunaga Niimi, pp. 81–87, Kyoritsu Publishing, October 1979).

Figure 3:
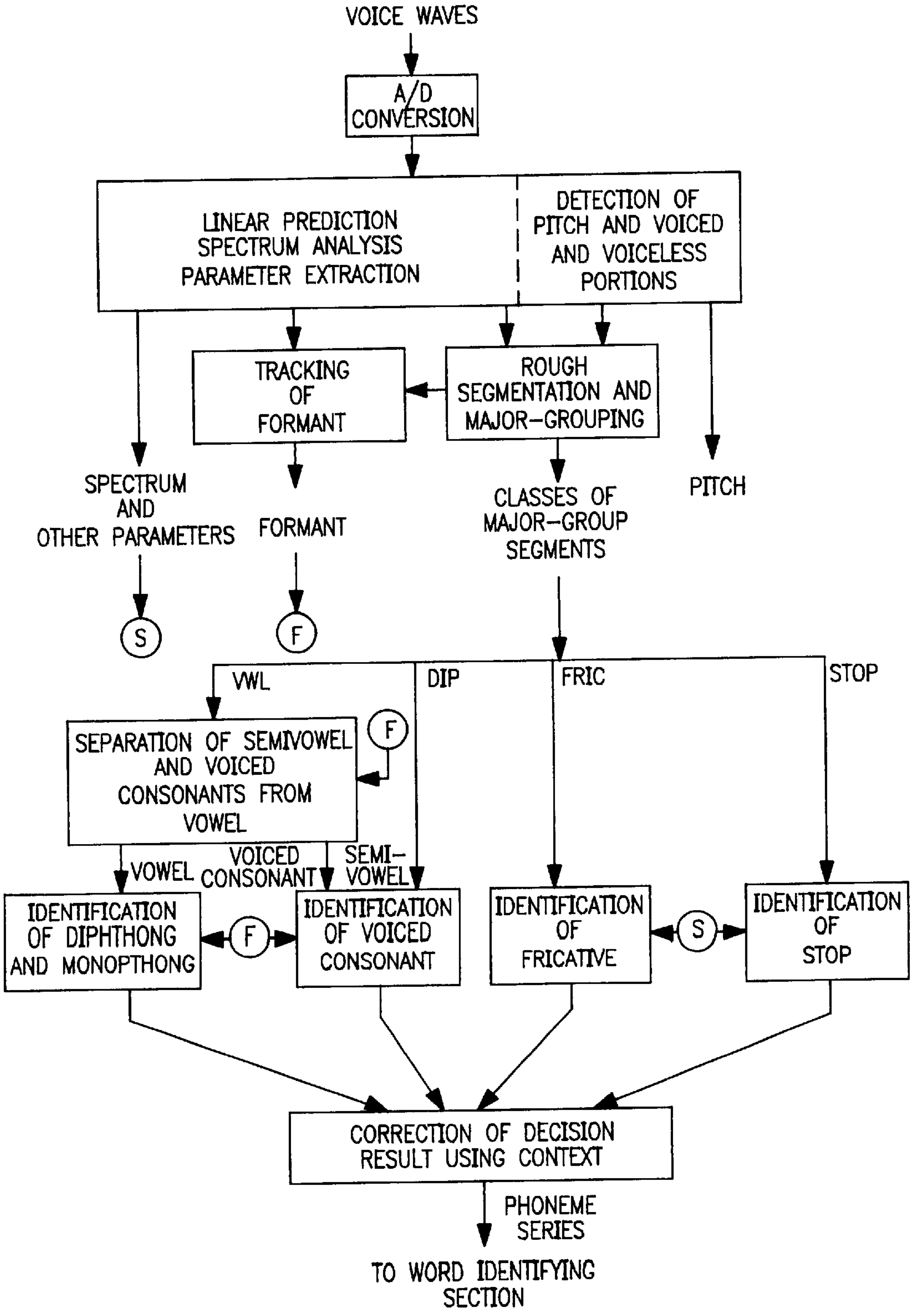
FIG. 3 is a block diagram of an acoustic analysis system.

The acoustic processing system is shown in FIG. 3. This system has the features noted below.

(1) Acoustic analysis employs both spectrum analysis based on the linear prediction technique and formant extraction.

(2) The system makes best use of the knowledge of acoustic phonetics. For example, dynamic characteristics of formants are used for recognition of nasal sounds and semivowels.

(3) It includes less levels of hierarchy in decision logic. Parameter values of adjacent segments are referred to, but the recognition results of these segments are not so utilized.

Input voice waves are first segmented and grouped into four major classes noted below.

(1) VWL (vowel like sound) Sounds like vowels, including vowels and voiced consonants (except stops and fricatives), sandwiched between vowels.

(2) DIP (dip) Portions including sharp dips in the magnitude which usually indicate the presence of voiced consonants.

(3) FRIC (fricative) Voiced and voiceless fricatives.

(4) STOP (stop) Voiced and voiceless stops.

Figure 4:
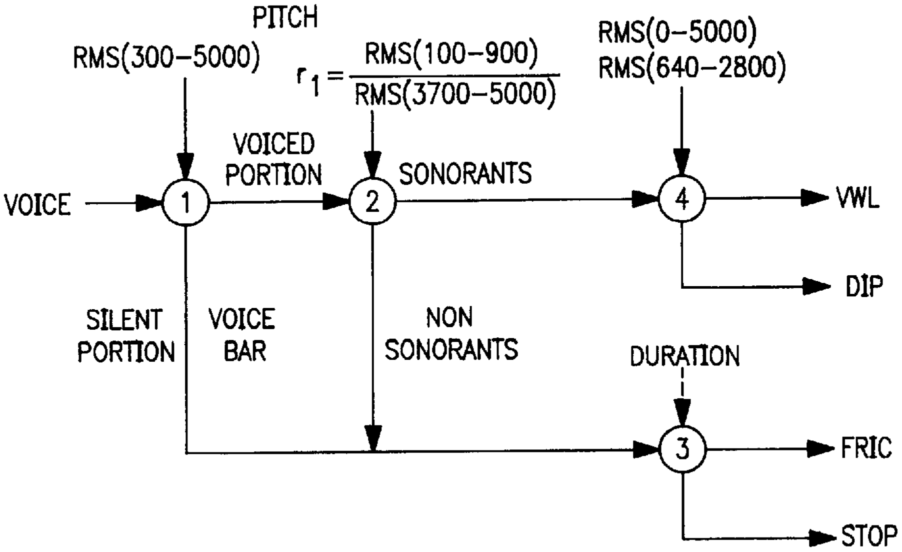
FIG. 4 is a flowchart showing the process of segmentation.

These segmentation and groupings are performed after the tree-like logic shown in FIG. 4.

Step (1)—Detection of silent portion: For a range of RMS (300–5000) (RMS (A–B) indicating root mean square energy from A to B Hz), voiced and silent portions are discriminated. Here, energy all over the band is not used to extract, as a silent portion, a voice bar (having emphasis in a frequency band less than 300 Hz) prior to a voiced consonant. The voice bar is detected by the presence of pitch and determined as a voiced silent portion.

Step (2)—Grouping into sonorants and non-sonorants: This step groups a vowel, a nasal sound and a glide as sonorants and a voiceless fricative, voiced fricative (with strong frication) and aspiration as non-sonorants. Phonemes such as /v/, /ð/, /h/ may be grouped into any of sonorant and non-sonorant categories depending on the environment before and after themselves. Parameters used are the presence or absence of pitch and an energy ratio $r_1$=RMS (100–900)/RMS (3700–5000) between low and high bands. When the presence of pitch is distinct, or $r_1$ has a great value, the sound of interest is grouped as a sonorant. When the pitch is absent and $r_1$ has a small value, the sound of interest is grouped as a non-sonorant. When the presence of pitch is very distinct although $r_1$ has a small value, the sound of interest is classified as a voiced fricative into a latter group. A decision is made in frame units of 5 ms length, followed by integrating and smoothing for segmentation.

Step (3)—Detection of burst and aspiration: The non-sonorant zone following the silent portion is grouped into FRIC and STOP using the duration. If the segment length is over 70 ms, it is grouped as FRIC. If below 70 ms, it is grouped as STOP. The latter is further grouped into an aspiration (segment length>25 ms) and a non-aspiration. For the STOP segment, the original waveform is differentiated to determine the time of explosion.

Step (4)—Detection of DIP: The method of detecting a voiced consonant based on dip of the energy function is utilized in almost all of the speech recognition systems, because it is very inexpensive and highly reliable. Depending on the kinds of consonants, some (such as /r/) produce a sharp dip, while some (such as a nasal sound) show a gentle dip. A step to cope with this point is required.

With this system, a DIP segment is separated from the sonorant segment using RMS (0–5000) and RMS (640–2800). RMS (640–2800) and is prepared especially for detecting a nasal sound. Those two energy functions are smoothed in two different ways (by changing the number of frames used to take a weighted average), and a point is searched where any value of the four resulting functions becomes minimum. If the energy ratio of the minimum point to an adjacent maximum point satisfies a certain condition, the segment of interest is judged as DIP. The boundary of the DIP segment is given by a point where the function is changed most sharply between the minimum point and the adjacent maximum point.

Figure 5:
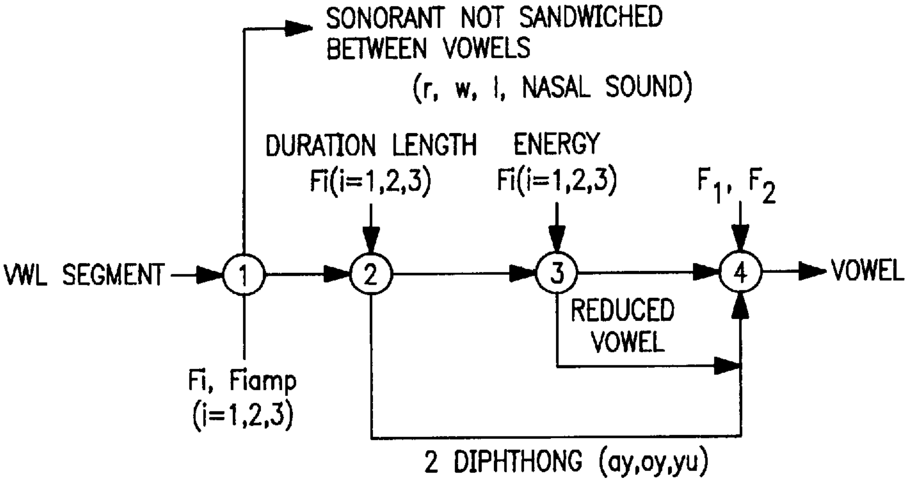
FIG. 5 is a flowchart showing a process for dividing and symbolizing a VWL segment.

The process of dividing and symbolizing the VWL segment is shown in FIG. 5.

Figure 6A:
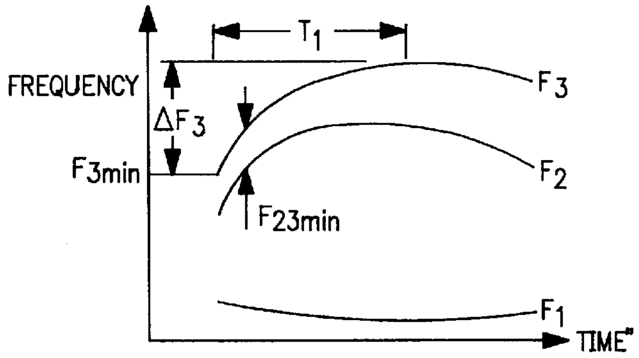
FIG. 6(*a*) shows a graph of /a/ preceding a vowel and FIG. 6(*b*) shows a flowchart showing the process for detecting such a /r/ preceding a vowel.
Figure 6B:
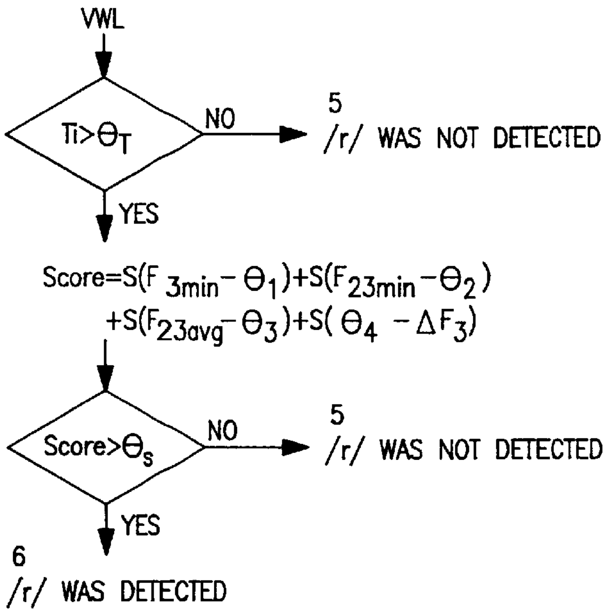

Step (1)—The VWL segment may be adjacent to any of the other three segments. If a nasal sound or glide /w, 1.r/ is present in the portion adjacent to FRIC and STOP, it is isolated using $F_1$, $F_2$, $F_3$, $F_{1amp}$, $F_{2amp}$, $F_{3amp}$ as parameters. For example, /r/ preceding a vowel is detected by utilizing dynamic characteristics of the formant as shown in FIGS. 6(*a*) and 6(*b*). Similar detection logic is applied to other phonemes as well. However, this logic is not always exclusive and a plurality of phoneme symbols may be applied to one segment.

Step (2)—After separation of non-vowel phonemes at both ends of the VWL segment, diphthongs such as /ay/, /∂y/, /yu/ are detected. The duration of the segment and dynamic characteristics of the formant are used as primary parameters. For example, /ay/ is detected on such conditions as sufficiently close to /a/ in front of the segment, long transition time of $F_2$, long duration of the segment, great change in $F_2$, etc.

Step (3)—For the remaining VWL segment, the presence of a reduced vowel without emphasis is checked based on comparison of energy with adjacent segments. This type vowel is excluded in advance because its formant is remarkably changed depending on the environment and the identification result lacks reliability.

Step (4)—For the segment passing through the decision logic of Steps (1)–(3), a vowel is identified using $F_1$ and $F_2$ of the central portion. Standard values $F_{1t}$ and $F_{2t}$ of each vowel have been adjusted for individual speakers. The identification result is given by what minimizes an absolute value $d=|F_{1m}-F_{1t}|+|F_{2m}-F_{2t}|/3$. In order to enable restoration of the erroneous recognition at a higher level of processing, the first to third candidates are outputted. The segment determined as a diphthong or reduced vowel is also subjected to a similar decision and the results are provided as the second and third candidates.

Figure 7:
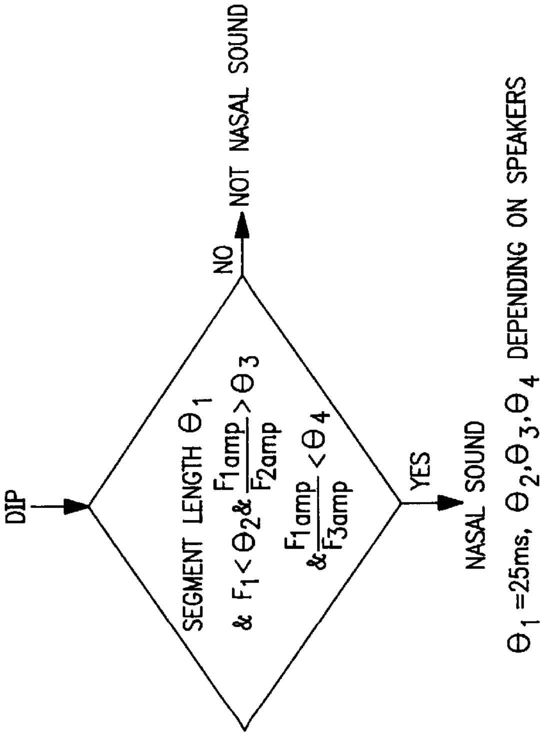
FIG. 7 shows a method for detecting a nasal sound using static parameters.

The DIP segment is grouped into five classes: N (nasal sound), w (/w/. /1/), ʃ(flapped t), r (/r/) and ▲ (others). This grouping employs a static decision using a parameter value of the valley of DIP and a dynamic decision using formant loci between an energy maximum point of the adjacent VWL segment and that bottom, in a combined manner. Parameters used in the static decision are a segment length, frequencies of the first to third formants, and their amplitudes. By way of example, the decision logic for N is shown in FIG. 7. The dynamic decision is the same as explained in VWL-(1) (see FIG. 6). The classes which have been detected by any of both the decisions are all outputted. The segment which has not been grouped into any of the classes N, w, ʃ, r is denoted by the symbol ▲.

The FRIC segment is grouped into four classes: f(/f/. /θ/). s(/s/. /z/). S(/ʃ/, /ʒ/) and F (others). Parameters used for the grouping are energy at the central portion of the segment and primary moment of the spectrum. The segment is classified as s if the value of the primary moment is great, and F if it is small. When the moment value is intermediate, the segment is classified as S if the energy value is greater, and f if it is small.

Clues for identifying the articulation mode and the articulation point of a stop are the presence or absence of sound occurred during a period of the stop, characteristics of the spectrum at the time of burst, formant transition to an adjacent vowel, etc. These clues cannot always be utilized. Further, the stop is a group of phonemes exhibiting characteristics specific to the phonemes at least frequency, and is remarkably changed depending on environment before and after itself. This system groups the STOP segment int 10 classes based on the presence or absence of vibrations of the vocal cord, the presence or absence of an aspiration, the position of the articulation point, etc.

Decision logic is arranged using the frequency at which the amplitude value is maximized in the spectrum of a single unit at the time of burst, and the ratio of the energy near that frequency to total energy. Where the adjacent segment is a sonorant, decision logic using a change in the formant frequency is also attempted. In general, however, grouping of the stop belongs to the most difficult ones and satisfactory results have not been achieved also in this system.

Figure 8:
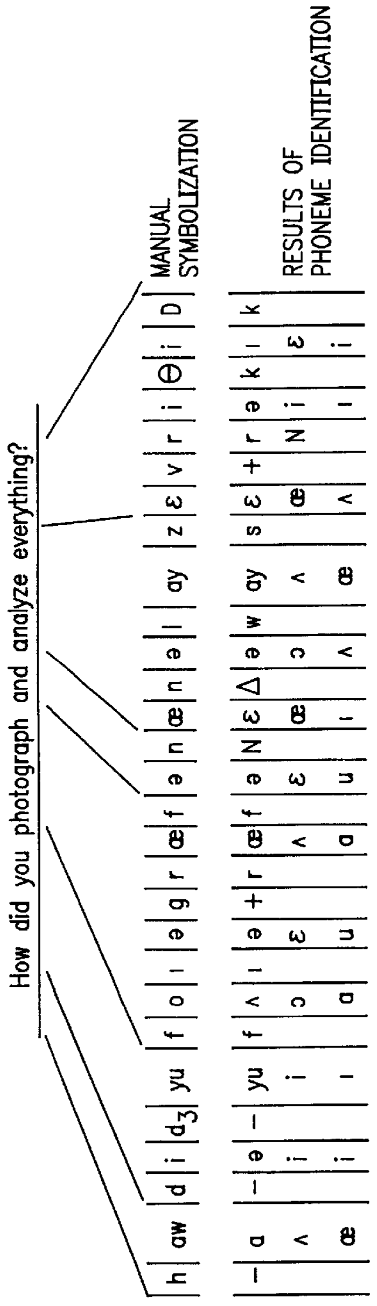
FIG. 8 shows an example of the output of the acoustic analysis system illustrated in FIG. 3.

Finally, an output example of this system is shown in FIG. 8.

Referring again to FIG. 1A, subsequently, in step S2, a pointer fr (in this case, the speech data are input from fr=1) which represents the frame of input speech is initialized (in this embodiment, it is "0" cleared). In step S3, the frame pointer fr is incremented and the next data is input. In step S4, whether the speech block is terminated or not is determined and when the speech data file is terminated, then the process is advanced to step S12; otherwise the process is advanced to step S5.

In step S5, the phoneme is determined by referring to the results of rough segmentation obtained by the process of step S1. This embodiment classifies phonemes into three kinds, vowels, semivowels and others, and the process along step S6, step S8, and step S10 is advanced according to the results thereof. In steps S6, S8, and S10, the vowels, the semivowels and other phonemes are recognized, respectively. When the recognition operation is terminated, the value output as the result is normalized in a range of "0" to "1" by each step of a step S7, a step S9, and a step S10.

Furthermore, a neural net which has learned the coefficients of each speaker in order to recognize the vowels at step S6 is used in this embodiment. The method for the preparation and the recognition of this neural net is described in "Speech Recognition With Probability Statistical Model" (Seiichi Nakagawa, pp. 156–177, Society for Electronic Information Communication, July 1988).

In this method, for a perceptron, although the number of output elements is limited to one, a learning algorithm with a discernable weighing factor $w_{ij}$ between categories which are linearly separable is used. A two-layer perceptron can learn segmental linear decision functions and a three- or more-layer perceptron can learn sum areas of those functions (see FIG. 9). The difference between a Boltzmann machine described here or a neural network (which include learning with a teacher) described below and the perceptron (multi-layer perceptron, layered machine) is that "discovery of a new learning method by introducing a sigmoid function in place of threshold function" contrary to the intuition of Papert Minsky, et al.; no essential difference is present therebetween.

Further, while HMM was to grasp statistic fluctuations in an input pattern with a probability model (in a positive manner), the multi-layer perceptron is to express them through dispersion using a link weighing factor of the network (in a negative manner). Thus, the multi-layer perceptron is nothing but one sort of statistic and stochastic techniques. In the perceptron, the link weighing factor is changed so as to provide the best separation between classes. This way of approaching is analogous to the configuration of HMM with maximization of the quantity of mutual information or the error correction method.

Figure 10:
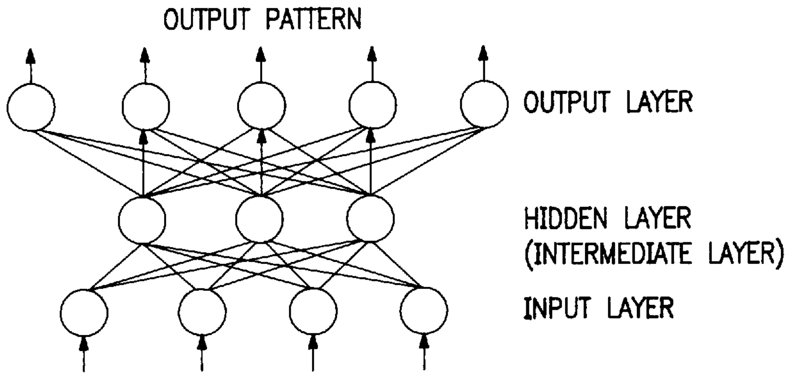
FIG. 10 shows a schematic representation of a three layer mutually associated type neural network.

A Boltzmann machine proposed by Hinton, et al., is regarded as, on one side, a special example of connectionist models—neural networks, but it can be taken as, on the other side, as an extended model of the HMM method in view of the fact that the status of each unit is determined by a probability distribution. The Boltzmann machine consists of, similar to a nerve circuit, n units (corresponding to neurons) and links(corresponding to synapses) coupling the units, as seen in FIG. 10. Each unit can assume two states. Let it be expressed by S={0, 1}(i=1, 2, . . . n). The strength of the link between a unit i and a unit j is represented by a real value (called weight) $w_{ij}=w_{ji}$, the value being changed through learning. A total input of the j-th unit is defined by:

$$u_j = \sum_{i \neq j} w_{ji} S_i + b_j \tag{1}$$

where $b_j$ is a threshold value.

$$u_j = \sum_{i \neq j} w_{ji} S_i + b_j$$

is also defined in some cases.

The status of the Boltzmann machine (network) at the given time is expressed by combinations $\alpha \in \{0,1\}^n$ of states (0,1) of all the units. For each status of the machine, "energy" E(α is defined below (the state of the unit i at α is usually expressed by $s_i^{\alpha}$, but here by $s_i$ for brevity)):

$$E_\alpha = \sum_{i<j} w_{ji} s_i s_j + \sum_j b_j s_j \tag{2}$$

Whenever each unit updates the state, it checks which one of two states leads to smaller energy. If the following energy gap ▲E is positive, the unit takes the state 1 and otherwise it takes the state 0.

$$\blacktriangle E_j = E(S_j=0) - E(S_j=1) = \Sigma S_i W_{ji} - b_j \tag{3}$$

As a result, the energy continues decreasing until it falls into some minimum value, thereby ensuring convergence of the status (equilibrium state). Although this is a network proposed by Hopfield, it would fall into local minimum value with gradient descent or hill climbing. A generalized version of that network is the Boltzmann machine which is featured in that the unit state is updated stochastically (to void convergence into a local minimum value) (Markov process). The probability which the unit j takes at the state 1 is assumed to be given by:

$$P_j = \frac{1}{1 + e^{-\Delta E_j / T}} \tag{4}$$

In this equation, T is a positive parameter called temperature. When T is high, the unit takes the values 0 and 1 at random. When T is low, it takes 0 (nearly deterministically) if $\blacktriangle E_j<0$ holds (in usual cases, it is gradually reduced through learning). Ignorance of the threshold value $b_j$ will not impair generality because it is interpreted such that a special unit always having the state 1 and the unit j are linked to each other with the strength of $-b_j$. As the status change proceeds in accordance with the above rules, the machine reaches a "thermal equilibrium state". However, the status change still proceeds even in the equilibrium state. Specifically, the machine reaches a "stochastic thermal equilibrium state" (ergodic theorem) and the probability P (α) which the machine takes a status α follows the Boltzmann distribution below:

$$P(\alpha) = C e^{-E\alpha/T} \tag{5}$$

where C is a normalizing factor to make the total probability over all the status equal to 1. In other words, the ratio of the probabilities which the machine takes two status α, β (i.e., the ratio of the number of times that the machine takes the status α to the number of times that it takes the status β as a result of observation for a long period) depends on only the difference in energy therebetween. Thus:

$$\frac{P(\alpha)}{P(\beta)} = e^{(E\alpha - E\beta)/T} \tag{6}$$

When T is high, the machine reaches the equilibrium state at earlier time, but the probability that it will settle to an extremum state at low energy is low. Conversely, when T is low, the machine requires a longer time to reach the equilibrium state, but the probability that it will settle to an extremum state at low energy becomes high. Usually, therefore, T is set to a higher value at first and then gradually reduced. This is called a simulated annealing process.

The simulated annealing process can be effectively applied to, for example, problems of layout of VLSI and the traveling salesmen, and is particularly suitable for such a case as obtaining an approximate solution of the combination optimizing problem. In case of these problems, an objective function requires to be converted in such a manner that it can be expressed equivalently with the energy defined by Equation (2).

For example, if a negative logarithmic value in the probability calculating formula of HMM is regarded as "energy", parameters of HMM could be estimated by the simulated annealing process. In fact, there is a report showing that the estimated values can be obtained with higher accuracy than case of using the F-B algorithm.

The learning algorithm of a mutually associated type Boltzmann machine which is believed effective in speech recognition will now be discussed. The mutually associated type (pattern associated type) Boltzmann machine consists of k number of I units corresponding to the input layer shown in FIG. 10, with h number of O units corresponding to the output layer, and m number of H units corresponding to the hidden layer (k+h+m=n). In a self-associated type model as another type, the I and O units are not discriminated from each other.

As a scale to check whether the status in which the machine reaches the equilibrium state is learned to a desirable status, the Kullback divergence known in the field of information theory and statistics is used. Thus:

$$G = \sum_{\alpha,\beta} P(I_\alpha, O_\beta) \log \frac{P(O_\beta | I_\alpha)}{P'(O_\beta | I_\alpha)} \tag{7}$$

where $P(I_\alpha, O_\beta)$ represents the probability that states of the I units corresponding to the input pattern are α and states of the O units corresponding to the output pattern are β for training samples, $P(O_\beta|I_\alpha)$ represents the conditioned probability, and $P'(O_\beta|I_\alpha)$ represents the probability that when states of the I units samples are α, states of the O units (corresponding to results at the time of recognition) are β for training samples under the status that the machine reaches the equilibrium state with the O units opened (no output pattern being applied). Therefore, when G is small, this implies that the machine can make learning satisfactorily. If Equation (7) can be regarded as a likelihood function (by reversing the sign), the maximum likelihood method is applicable so that the learning algorithm closely related to the EM algorithm or Baum-Welch algorithm may be obtained. The partial differential of G for $w_{ij}$ is given by:

$$\frac{\partial G}{\partial \omega_{ij}} = -\frac{1}{T}\left(P_{ij} - P_{ij}'\right) \tag{8}$$

where $P_{ij}$ is the probability that when the I and O units are fixed (given as the training samples), the units i and j take 1 simultaneously, i.e., an expected value of $S_i.S_j$, and $P'_{ij}$ is the probability that when only the I units are fixed and the O units are open, the units i and j take 1 simultaneously. Equation (8) can be derived as follows. From $$P'(I_\alpha, O_\beta) = \frac{e^{-E_{\alpha\beta}/T}}{\sum_{\lambda,\mu} e^{-E_{\lambda\mu}/T}} \tag{9}$$

$$E_{\alpha\beta} = -\sum_{i<j} \omega_{ij} s_i^{\alpha\beta} s_j^{\alpha\beta},$$

$$\frac{\partial e^{-E_{\alpha\beta}/T}}{\partial \omega_{ij}} = s_i^{\alpha\beta} s_j^{\alpha\beta} e^{-E_{\alpha\beta}/T}/T \tag{10}$$

the following is resulted:

$$\frac{\partial P'(I_\alpha, O_\beta)}{\partial \omega_{ij}} = \frac{e^{-E_{\alpha\beta}/T} s_i^{\alpha\beta} s_j^{\alpha\beta}/T}{\sum_{\alpha,\beta} e^{-E_{\alpha\beta}/T}} - \frac{e^{-E_{\alpha\beta}/T} \sum_{\lambda,\mu} e^{-E_{\lambda\mu}/T} s_i^{\lambda\mu} s_j^{\lambda\mu}/T}{\left(\sum_{\lambda,\mu} e^{-E_{\lambda\mu}/T}\right)^2} \tag{11}$$

$$= \left[ P'(I_\alpha, O_\beta) s_i^{\alpha\beta} s_j^{\alpha\beta} - P'(I_\alpha, O_\beta) \times \sum_{\lambda,\mu} P'(I_\lambda, O_\mu) s_i^{\lambda\mu} s_j^{\lambda\mu} \right] / T$$

Also, since $P(I_\alpha, O_\beta)$, $P'(I_\alpha)$ are (fixed and therefore) independent of $w_{ij}$, there holds:

$$\frac{\partial G}{\partial \omega_{ij}} = -\sum_{\alpha,\beta} \frac{P(I_\alpha, O_\beta)}{P'(O_\beta|I_\alpha)} \cdot \frac{\partial P'(O_\beta|I_\alpha)}{\partial \omega_{ij}} = -\sum_{\alpha,\beta} \frac{P(I_\alpha, O_\beta)}{P'(I_\alpha, O_\beta)} \cdot \frac{\partial P'(I_\alpha, O_\beta)}{\partial \omega_{ij}} \tag{12}$$

Here, using the relationship of:

$$\sum_{\alpha,\beta} P(I_\alpha, O_\beta) = 1 \tag{13}$$

putting of Equation (11) into (12) leads to:

$$\frac{\partial G}{\partial \omega_{ij}} = -\frac{1}{T}\left\{ \sum_{\alpha,\beta} P(I_\alpha, O_\beta) s_i^{\alpha\beta} s_j^{\alpha\beta} - \sum_{\lambda,\mu} P'(I_\lambda, O_\mu) s_i^{\lambda\mu} s_j^{\lambda\mu} \right\} \equiv -\frac{1}{T}\left(P_{ij} - P_{ij}'\right) \tag{14}$$

As will be seen from Equation (8), the machine continues learning with the gradient descent by changing $w_{ij}$ after the following equation:

$$\Delta w_{ji}' = \epsilon (P_{ij} - P_{ij}') \tag{15}$$

Note that the direction of change is apparent, but its magnitude Σ is not clear. It seems usually better to use a constant value as the magnitude.

To put it in short, the learning algorithm is given by repeated 4 steps of (1)–(4) in Algorithm 1 below.

Algorithm 1 Learning Algorithm of Boltzmann Machine (1) Initialization: initial values (random values) are set to all weights.

(2) Training phase: by fixing the I and O units with the training samples, $P_{ij}$ for the links between the units after reaching the thermal equilibrium state is obtained.

(3) Checking phase: by fixing only the I units with the training samples and making the O units open (of course, with appropriate initial states given), similar $P_{ij}'$ is obtained.

(4) Update of weight of each link: the weight of each link is updated after Equation (15).

In practice, it is likely to happen that the machine is so dependent on the training samples that the energy (weight) may be infinite for a pattern somewhat different from the training samples. To avoid this, there is adopted a technique of "noisy output" or "noisy clamping" (e.g., changing an input which causes a given unit to have the state 1, to another input which causes the unit to have the state 0 at probability of 0.15), or a technique of increasing or decreasing $w_{ij}$ by a certain value depending on whether $P_{ij}-P_{ij}'$ is positive or negative. The Boltzmann machine is disadvantageous in taking a longer learning time than the back-propagation in a neural network described below. However, the learning in the Boltzmann machine can be sped up by fabricating an analog circuit in the hardware.

The Boltzmann machine can be directly applied to recognition of a static pattern. There will be described the result of Prager, et al. who applied the Boltzmann machine to recognition of vowels which are featured in having steady voice spectra. In the Boltzmann machine used for the vowel recognition, hidden units (in number 40) and output units (in number 8) are linked to all of units (input and output units are also linked to each other, but no links are present among the input units and among the output units). A spectrum is applied to the input units (in number 128 or 2,048). A spoken vowel is converted by the FFT analysis at a pitch cycle into spectra of 128 lines. Because the amplitude values of the spectra would be lost if binary-coded, they are compared with each other in two ways using a model in which the amplitude value is handled by multi-value units each quantitizing it in 16 steps ranging from 0 to 1.5 with a step width of 0.1 (number of input units is 128), and a model in which the amplitude value is expressed by 16 binary elements (e.g., if the amplitude value is 0.3, the 4-th unit is set to 1 and other 0-th to 3-rd and 5-th to 15-th units are set to 0; the number of input units is 2,048).

An experiment was made on 11 kinds of English vowels. The output patterns were each expressed in the form of 8 bits (eight output units). The machine was set such that the vowels, which are analogous to each other under conditions that two of 8 bits take 1, produced analogous patterns. As training samples, there were used a total of 132 samples (frames) obtained by three male speakers uttering each vowel four times. While the recognition score for the training samples was 89%, the recognition rate for samples uttered by other men was as low as 70%. This result will be improved if the number of training samples is increased. Learning of one set of 132 samples took about 6 minutes using a VAX 11/750, and was required to be repeated several hundred times until convergence.

The recognition experiment using the multi-binary models employed a Boltzmann machine consisted of 2,048 input units, 50 hidden units and 10 output units. Training samples were 264 samples (frames) uttered by each of three male and female speakers. The vowel recognition score was about 99% for the same training samples, and about 85% for other samples uttered by the same speakers. The learning time was increased about 10 times the above case of using the multi-value model because of the increased number of units.

For recognizing spoken consonants or words, time series patterns such as spectra must be used. By segmenting all the time series patterns into segments in equal number and expressing the time series pattern for one segment using a mean spectrum or the like, the techniques in the preceding section can be applied directly. This section describes, after Prager, et al., a technique of handling time series patterns with variable lengths as they are.

Figure 11:
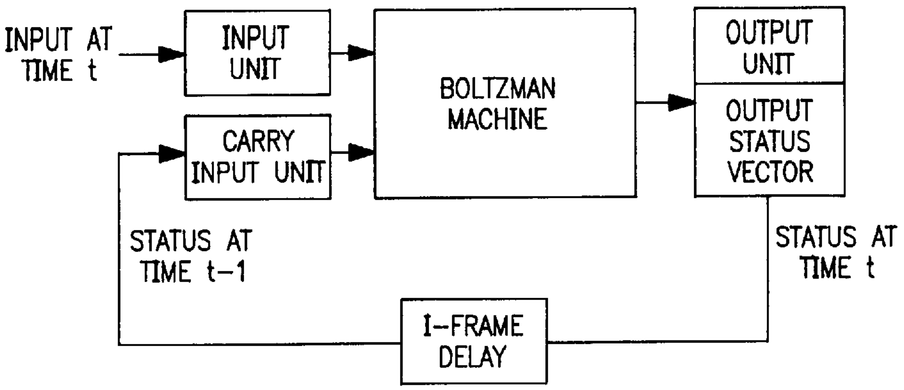
FIG. 11 shows a block diagram of a Boltzmann machine for recognizing a time series pattern.

FIG. 11 shows a block diagram of a Boltzmann machine for handling time series patterns. In order to express the time series patterns in the Markov process like HMM, it is assumed that an output vector at time t-1 is inputted as a carry vector to an input unit at time t. At the time t, a feature vector of the corresponding voice is of course also inputted to the input unit. In case of recognizing spoken words, the same output pattern is set for all of input vector patterns in each spoken word (it is also probably possible to set the output pattern for only an end frame of the word).

Experiments were conducted by making separate machines learn two phrases uttered once by one male speaker: "Gosh those shoes are so very thin" and "Do you see the tree?". Thus, the former case corresponds to learning of seven words and the latter case corresponds to learning of five words. An input spectrum was inputted using a multi-binary model, and the Boltzmann machine used consisted of 2,048 input units, 20 hidden units, 5 output units and 25 carry input units. For comparison, learning was repeated about 100 times in each of cases of using no carry inputs (ignoring the context of the time series pattern in terms of time), using the same carry input vector for first and second phases of the learning, and using different carry input vectors for the first and second phases. While the results were better in the case of using no carry vectors at the smaller number of learning times, the effect of using the carry vector(s) began to appear as the learning times proceeds to approximately 50. Of the cases of using the carry vector(s), the superior result was obtained in the case of using the same carry vector for the first and second phases. However, this case required about twice the learning time; i.e., 200 times of learning took about 200 hours using the VAX 11/750. Although recognition experiments were not made, the desired pattern of the output units and the pattern of the output units after learning were almost perfectly coincident with each other.

The learning algorithm with back-propagation for the mutually associated type (pattern associated type) network described in the above section will now be described. In addition, there are a competitive learning method (a model in which the reaction of each unit depends on a relative value with respect to another unit), and a learning method with stochastic units (Boltzmann machine). A network model is the same as that of the Boltzmann machine and consists of three layers, i.e., I, H and O layers (the H layer may be two or more layers). Such a network is called a connectionist model by recognition psychologists, and a neural network by engineers.

When an input pattern lp is applied, the total sum of inputs are defined by:

$$\mu_{pj} = \sum_i \omega_{ji} o_{pi} \tag{16}$$

Here, if i in an input unit, $o_j = I_j$ holds. The value of a unit j is converted with $u_{ij}$ using a differentiable logistic function below (into a hypersurface):

$$o_{pj} = \frac{1}{1 + c^{-\mu_{pj}}} \tag{17}$$

When a given pattern is applied to the input layer, the difference between an actual value $o_{pj}$ and a desirable value $t_{pj}$ of the output unit j is defined by:

$$E_p = \frac{1}{2} \sum_j (t_{pj} - o_{pj})^2 \tag{18}$$

At this time, as described in the above section, a change extent of the strength (weight) $w_{ji}$ between the units i and j is given by:

$$\Delta_p \omega_{ji} \propto -\frac{\partial E_p}{\partial \omega_{ji}} \tag{19}$$

Here:

$$\frac{\partial E_p}{\partial \omega_{ji}} = \frac{\partial E_p}{\partial u_{pj}} \cdot \frac{\partial u_{pj}}{\partial \omega_{ji}} \tag{20}$$

From Equation (16):

$$\frac{\partial u_{pj}}{\partial \omega_{ji}} = \frac{\partial}{\partial \omega_{ji}} \sum_k \omega_{jk} o_{pk} = o_{pi} \tag{21}$$

Therefore:

$$-\frac{\partial E_p}{\partial \omega_{ji}} = \delta_{pj} o_{pi} \tag{22}$$

$$\Delta_p \omega_{ji} = \eta \delta_{pj} o_{pi} \tag{23}$$

where $\eta$ is a constant called a learning rate. $\delta_{pj}$ is given by:

$$\delta_{pj} = -\frac{\partial E_p}{\partial u_{pj}} = -\frac{\partial E_p}{\partial o_{pj}} \cdot \frac{\partial o_{pj}}{\partial u_{pj}} = (t_{pj} - o_{pj}) o_{pj} (1 - o_{pj}) \tag{24}$$

for the output units, and by:

$$\begin{aligned} \delta_{pj} &= -\frac{\partial E_p}{\partial u_{pj}} = -\frac{\partial E_p}{\partial u_{pj}} \cdot \frac{\partial o_{pj}}{\partial u_{pj}} = -\sum_k \frac{\partial E_p}{\partial u_{pk}} \frac{\partial u_{pk}}{\partial o_{pj}} \cdot \frac{\partial o_{pj}}{\partial u_{pj}} \\ &= -\sum_k \frac{\partial E_p}{\partial u_{pk}} \frac{\partial}{\partial o_{pj}} \sum_i \omega_{ki} o_{pi} \cdot \frac{\partial o_{pj}}{\partial u_{pj}} = -\sum_k \frac{\partial E_p}{\partial u_{pk}} \omega_{kj} \frac{\partial o_p}{\partial u_{pj}} \\ &= o_{pj}(1 - o_{pj}) \Sigma \delta_{pk} \omega_{kj} \end{aligned} \tag{25}$$

for the hidden units.

Figure 12:
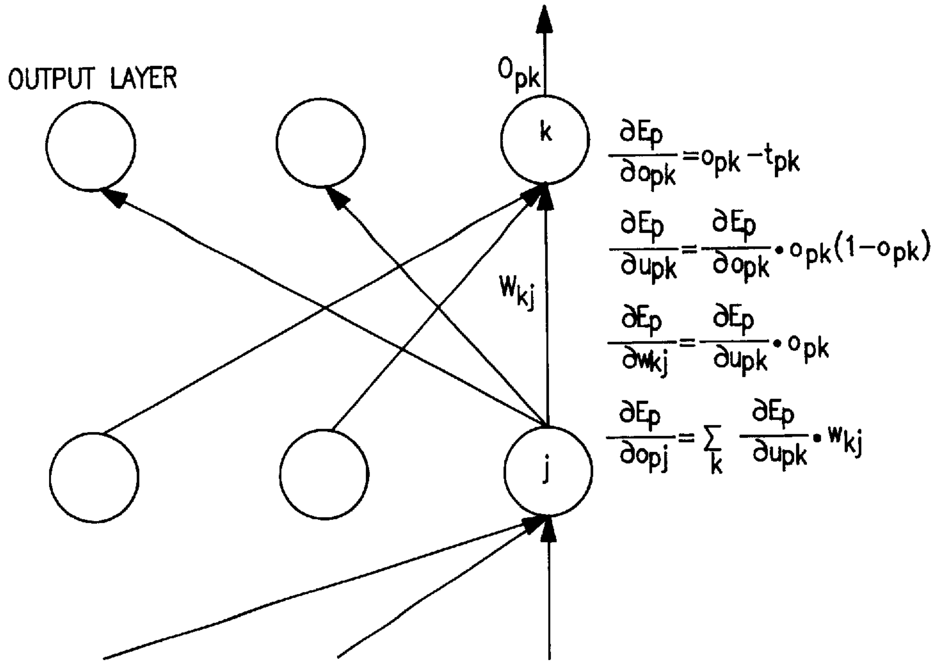
FIG. 12 shows a schematic view of the calculation procedure for calculating the partial derivative of E with respect to o of the intermediate layer in a multi-layered neural network.

Since Equation (25) includes $\delta_{pj}$ obtained by Equation (24), $w_{ji}$ of the hidden units is updated after updating of $w_{ji}$ for the output units. This is also applied to the case of the hidden layer being multi-layered, where updating is made starting from the layer at the last downstream stage in a like manner (see FIG. 12). Thus, this process is called back-propagation because calculations proceed backward.

If the value of n in Equation (23) is set large, the change width of the link strength is increased. In some cases, the strength change may not settle, but oscillate. In order to settle it early without causing oscillation, the relatively large value of $\eta$ is often used by utilizing a change extent of the weight in the preceding stage shown in the following equation (it is advantageous to use a value reversely proportional to fan-in indicating the network size);

$$\blacktriangle w_{ji}(n+1) = \eta \delta_{pj} O_{pi} + \alpha \blacktriangle w_{ji}(n) \tag{26}$$

where $\alpha$ is momentum weight and n is the number of times of learning. The above learning algorithm is summarized as shown in Algorithm 2 below.

Algorithm 2: Learning Algorithm with Back-Propagation (1) Initialization: initial values (random values) are set to all weights;

(2) Training data is inputted and results are outputted (through calculation proceeding forward).

(3) The link strength is updated to reduce errors in the results (through calculation proceeding backward).

(4) (2) and (3) are repeated until convergence.

Thus, the back-propagation process can be regarded as a generalized version of the error correction learning process (delta learning process) for perceptrons. It is empirically known that assuming the number of link lines be N, the quantity of the forward and backward calculations is proportional to O(N), the number of the training samples to O(N), the number of times of learning to O(N), and the quantity of total calculations required for the learning to $O(N^3)$. The total will be reduced to $O(N^2)$ if the calculations are executed in parallel.

It is also empirically known that the back-propagation rarely reaches a local minimum value, but reaches an optimum solution in most cases. This is because if the network has the units and link lines more than the necessary minimum number, it has many optimum solutions.

Further, if the learning is conducted to make the input and output unit patterns equal to each other, the respective hidden units grasp features of speech, thereby learning one sort of dimension reducing function of feature parameters (the number of hidden units corresponding to the number of dimensions).

Figure 9:
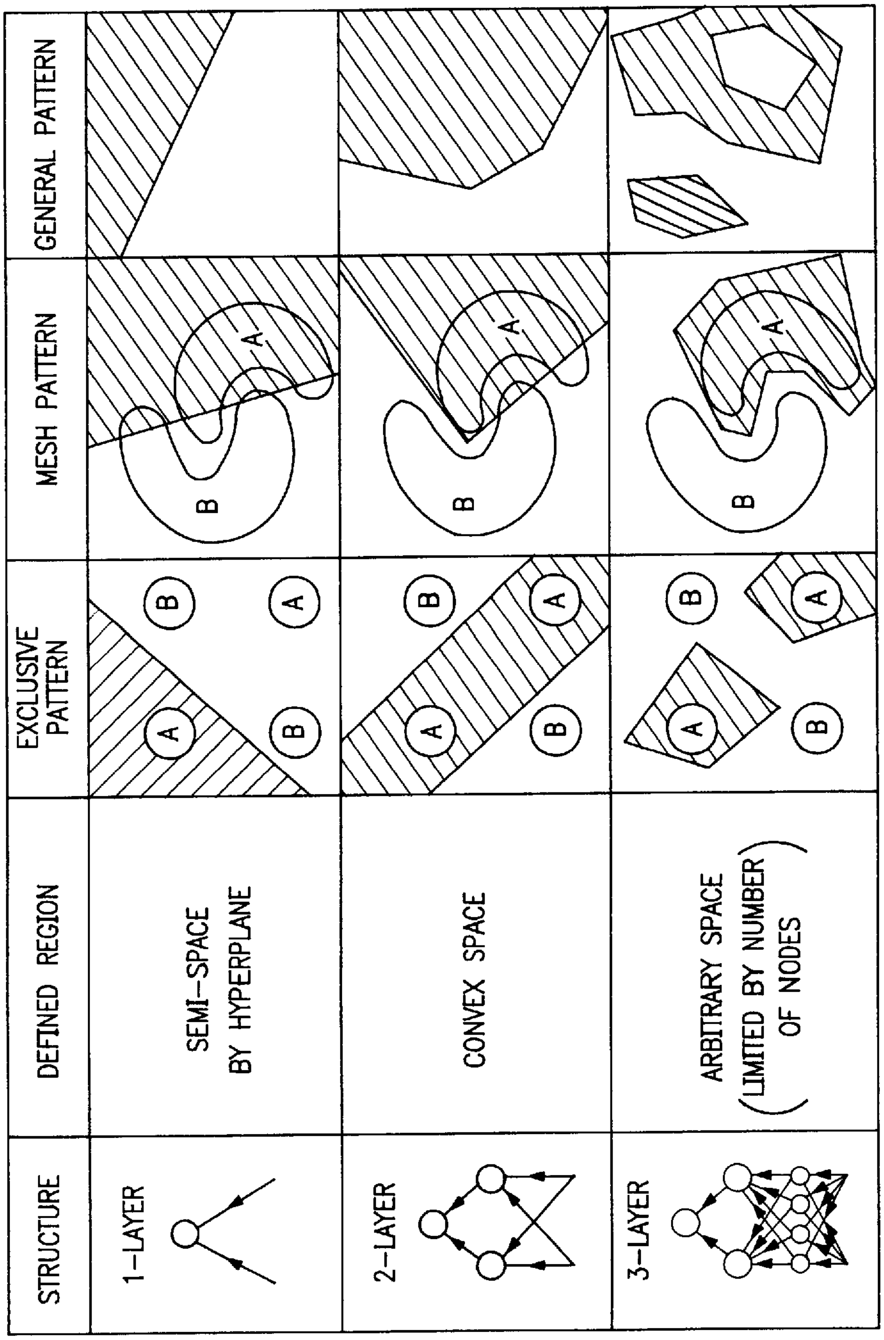
FIG. 9 shows the relationship between the number of hidden and intermediate layers and the discriminating power of a preceptron neural network.

Burr at Bell Communication Laboratory tried to recognize spoken 10 digits using both the 3-layer network shown in FIG. 9 and the back-propagation process. Speech samples were sets of 10 digits uttered 10 times by one male speaker, a half of the samples being used for each of training and test. The speech was sampled at 11 kHz and converted into a time series in the form of FFT CEPstrum. Of the time series, 4 parameters ranging from 4- to 7-order of each of the frame having a maximum power value and the two frames immediately before and after it, i.e., total 12 parameters, were employed as input patterns.

The learning is performed for networks consisting of 12 input units, 10 output units and 5 to 64 hidden units. Then, $\eta$=2.0 and $\alpha$=0.9 were set in Equation (26), and {0.1, 0.9} was used as $t_{pj}$ in Equation (18) instead of {0, 1} to avoid an increase in the link strength.

The recognition rate was 95% in case of 5 hidden units, 99.5% in case of 13 and, thereafter, practically saturated. Even after excluding about ⅓ of the hidden units in which the link strength $w_{ji}$ is smaller than the threshold value (this is equivalent to setting them to 0), the recognition scores were almost the same. The above recognition scores were nearly equal to those obtained by applying the NN method (nearest-neighbor rules) using the Euclidean distance to the same data base. As the number of hidden units increases, convergence is reached with the smaller number of repeated times of learning, but the learning time per one time increases.

Lippmann, et al., at MIT Lincoln Laboratory performed recognition of seven digits (one, two, three, four, five, six, eight) each comprising one syllable. Speech of respective digits each uttered by 16 speakers 26 times (10 times for learning and 16 times for test) was subjected to the CEPstrum analysis. Lower 11-order CEPstrum factors of two zones, i.e., a zone in which power is maximized and a zone 30 ms before the former, were used as recognition data.

For comparison with a multi-layer perceptron, the data was also recognized using the Gauss method and the KNN method. The Gauss method employs a secondary decision function based on the Bayesian decision rules on the assumption that each category exhibits a Gauss distribution over a pattern space. However, the co-variance matrix used in the experiment comprises only diagonal components and is thus equivalent to the weighed Euclidean distance. The KNN method is to represent one category by a plurality of patterns, and employ the distances between the object to be recognized and the nearest K patterns. K=1 was set in the experiment.

Perceptrons used has 1 to 3 layers (or 2 to 4 layers including an input layer). The 1-layer perceptron has 22 and 7 units in the input and output layers, respectively. The 2-layer perceptron has an intermediate layer containing 16 to 256 units in addition to the above. The 3-layer perceptron has 32 to 256 units in the first intermediate layer and 16 units in the second intermediate layer.

Figure 13A:
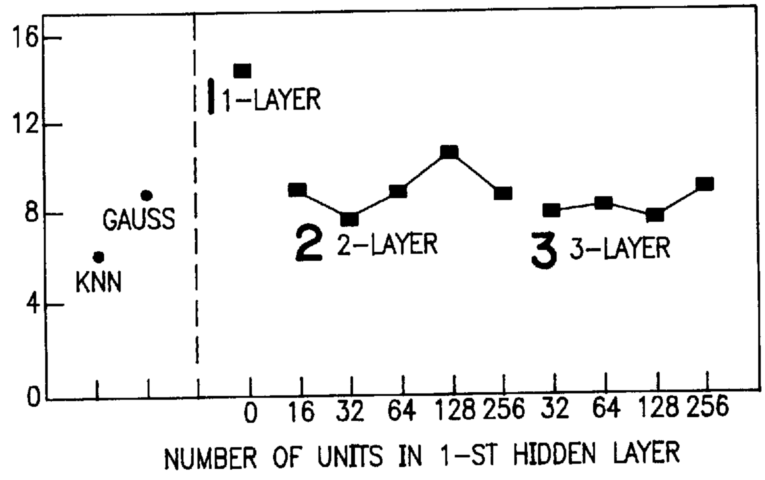
FIGS. 13*a* and 13*b* illustrate graphs showing a comparison between prior methods and multi-layer preceptrons in 10 digit recognition, where
Figure 13B:
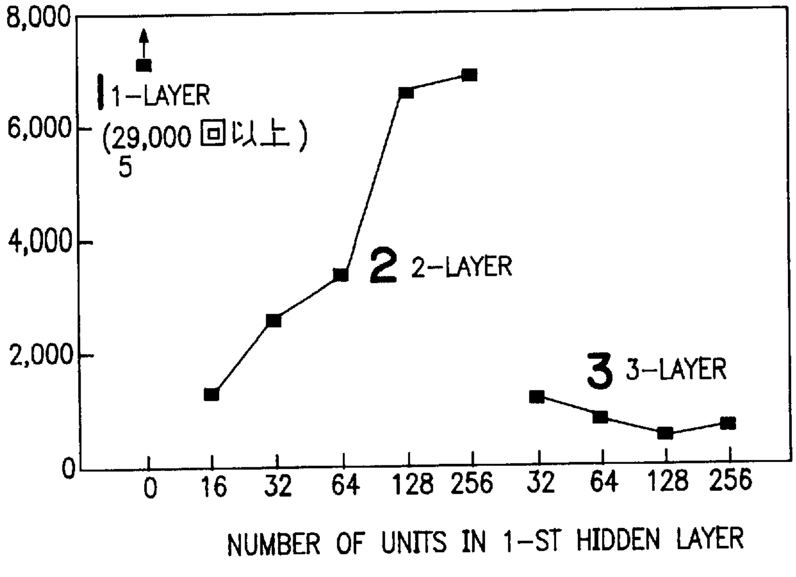

Experimental results in a specified speaker mode are shown in FIGS. 13(*a*) and (*b*). FIG. 13(*a*) shows error rates in the digit recognition. The 2- and 3-layer perceptrons gave a recognition accuracy comparable to the prior methods ($\eta$=0.1, $\alpha$=0.4). FIG. 13(*b*) shows the number of repeated times necessary for learning. It is found that with the number of layers increasing, the learning is accomplished at the smaller number of repeated times.

The above two experiments are both preliminary ones in which all patterns of the spoken digits are not used and the processing for time series patterns are not performed; even so they the show effectiveness of the neural network.

A group of Elman, et al. at San Diego College of California University performed recognition of /b,d,g/ (9 syllables with succeeding vowels /a,i,u/) uttered by specified speakers in a like manner to the above. A time series for 20 frames each comprising FFT spectra of 16 channels (output value of each channel being converted to (0–1), i.e., total 320 feature parameters, were inputted to 320 input units, and the recognition score of about 95% was obtained by a network comprising 2 to 6 hidden units and 9 output units. In this case, the effect of learning was improved by adding white noise to inputs.

Figures 14A, 14B, 14C:
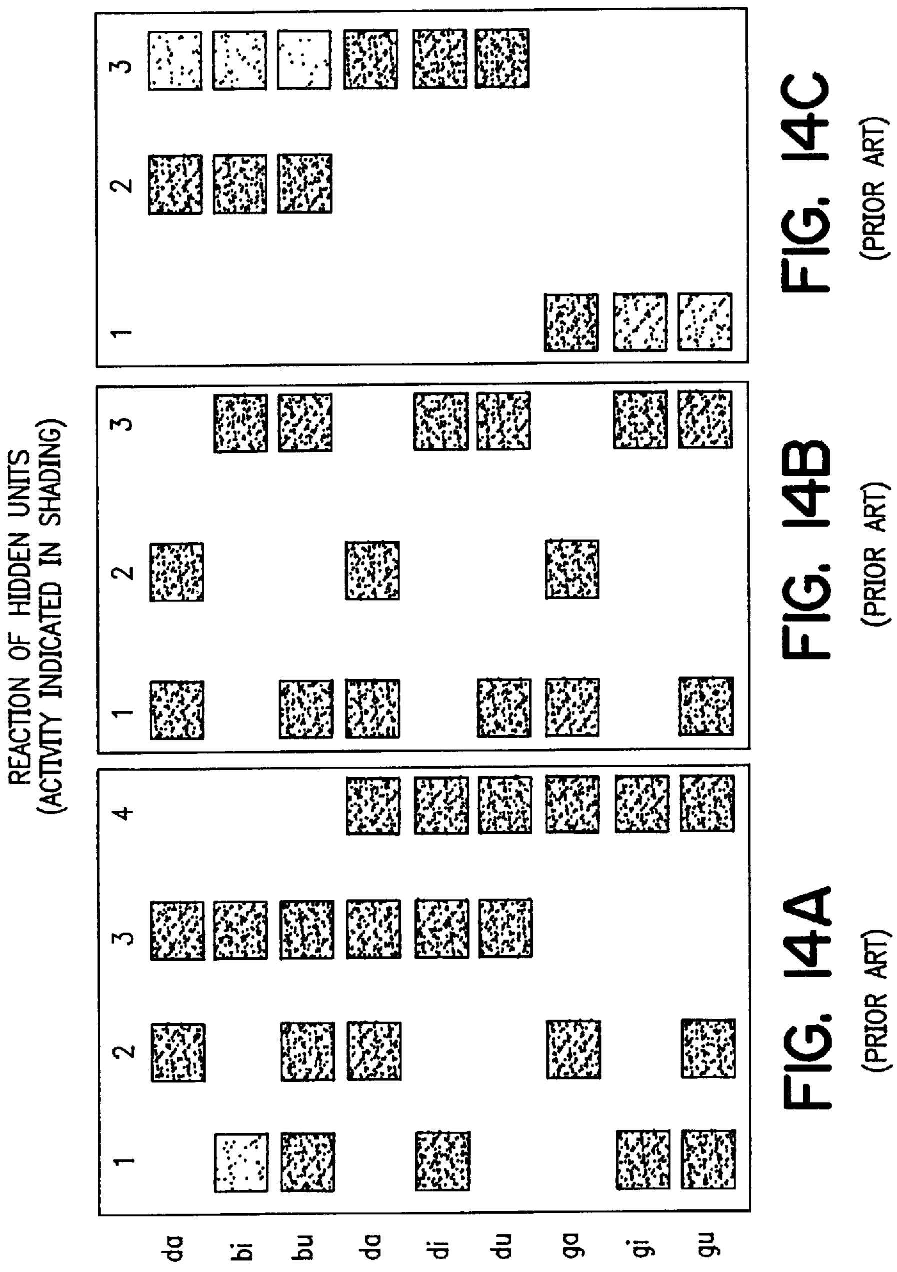
FIGS. 14*a*, 14*b*, and 14*c* show graphs of the reaction values of hidden units when the input patterns are applied to the network, where

FIGS. 14(*a*), (*b*), and (*c*) show reaction values of the hidden units when the input patterns were applied to the network after learning. FIG. 14(*a*) represents the case where the learning was made by applying labels of 9 syllables to the output units, FIG. 14(*b*) represents the case of applying labels of 3 vowels, and FIG. 14(*c*) represents the case of applying labels of 3 consonants. The uppermost numerals indicate the number of the respective hidden units. It is found that each hidden unit exhibits a distinctive reaction.

Figure 15:
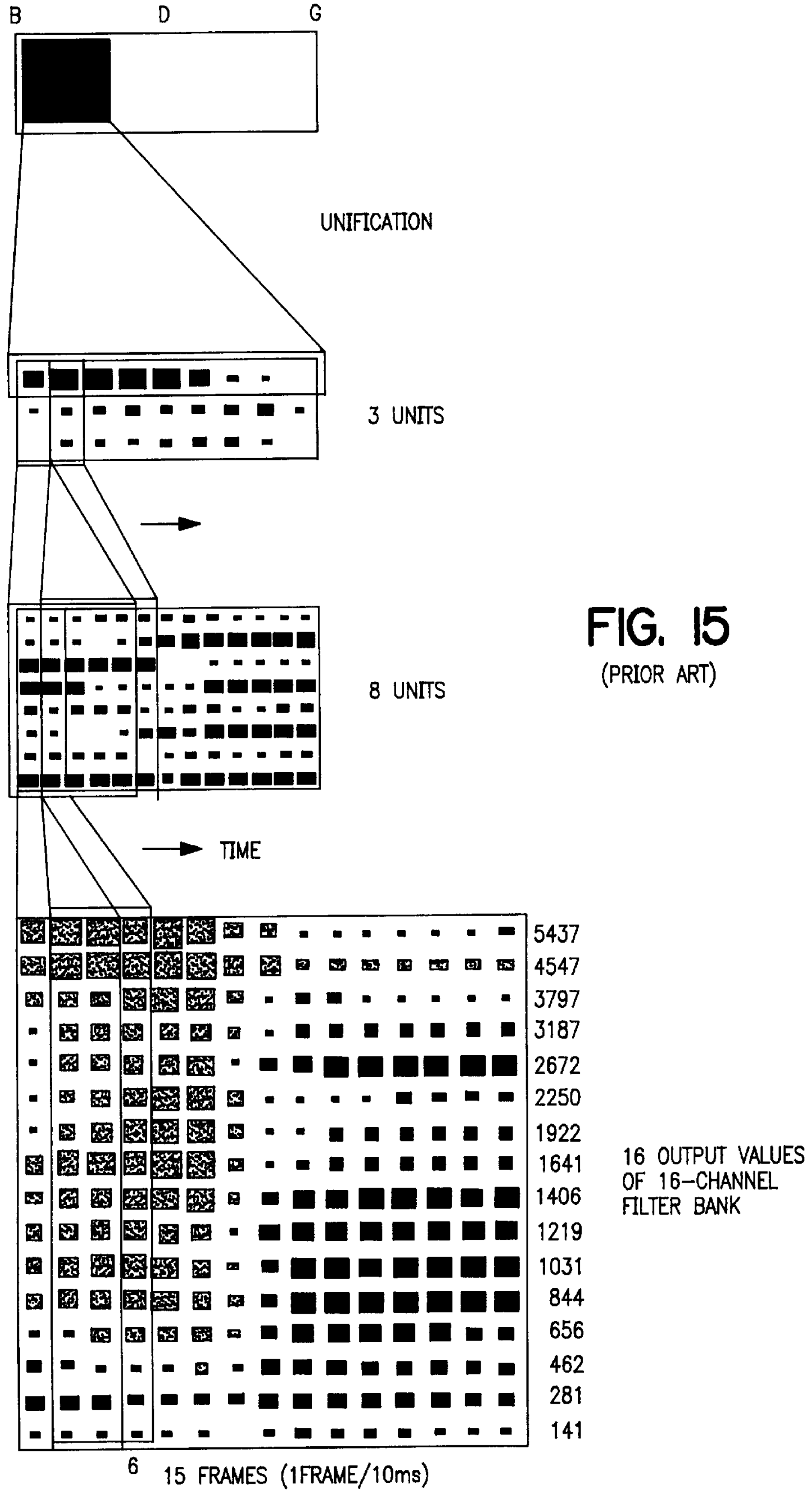
FIG. 15 shows a schematic diagram a neural network having delay units.

Waibel, et al. at Carnegie Melon University proposed a model (TDNN: Time-Delay Neural Network), shown in FIG. 15, in which a partial time series pattern is introduced as one set into the network for coping with the time series pattern, and applied the model to recognition of voiced explosives. The time series spectral for 3 frames are linked to the hidden layer by the same link lines (weight) regardless of time. Specifically, with the networks implemented using delay units, the number of links amounts to (16×3+1)×8×13+(8×5+1)×3×9+(3×9+1)×3=6,287 or (16×3+1)×8+8 (8×5+1)×3+(3×9+1)=543 (+1 corresponding to the link line coupled with the threshold unit). The first hidden layer corresponds to the dimension reducing process by the K-L development in time series units of 3 frames and present the dimension reducing and feature extraction by nonlinear conversion. In the example of FIG. 15, for instance, the reaction value of the first hidden layer grasps dynamic changes of the format frequency. After repeating the learning 20–50 thousands times with about 800 training samples of b, d, g uttered by the specified speakers, a recognition score as high as about 98.4% is obtained for other test samples.

The neural network is a model which can grasp features depending on the context of the time series and includes HMM, whereas it is inferior to HMM in not a few points of learning time, design of model, difficulty in theoretical development (weak mathematical basis), difficulty in application to the time series pattern and continuous speech, etc. Particularly, the difference between the neural network and HMM becomes negligible in a model of handling dynamic warping of time series patterns in a positive manner.

Figure 16A:
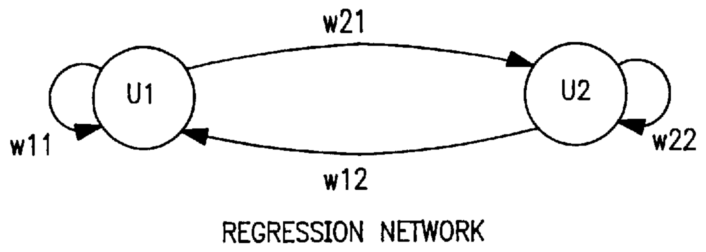
FIG. 16(*a*) shows a schematic diagram of a regressive network for recognition of a time series pattern and FIG. 16*b* shows a schematic diagram of a forward multi-layer network.
Figure 16B:
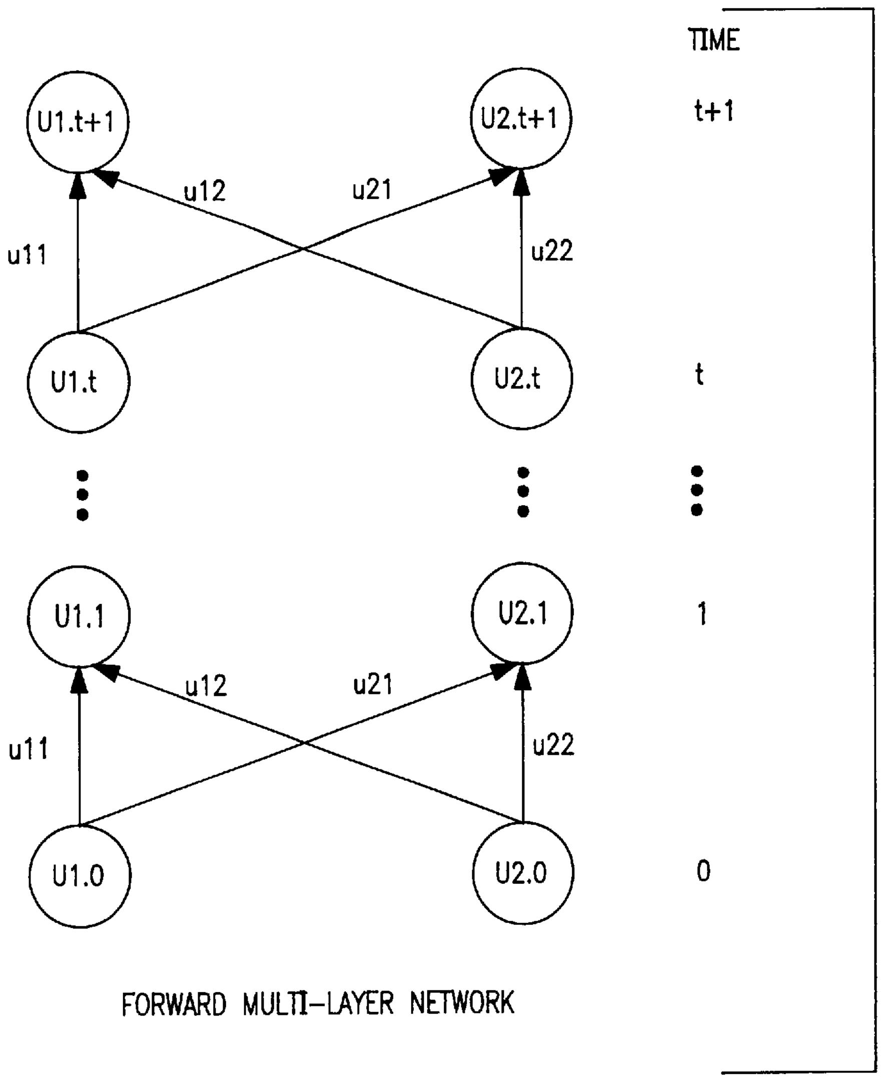

A regressive network expression is introduced for recognition of the time series patterns, such as speech recognition. For example, a regression network of FIG. 16(*a*) can be converted into a multi-layer network having one corresponding layer at each time in FIG. 16(*b*). The time series patterns are sequentially inputted to an input layer at each time, and inputs to the input layer are turned off after application of patterns for a last frame and until reaching an output layer. Error evaluation of this network is determined by the difference between an actual status and a desired status at given time. To this end, however, back-propagation is required along the time base and the history of the state of each unit must be preserved. The strength of each link has a differential value (difference value) of errors in many number (corresponding to the number of frames) changeable at each time, and the actual weight may be updated depending on the sum (mean value) of those differential values. Except feedback loops other than specific loops, this model is analogous to the left-to-right model of HMM.

Figure 17:
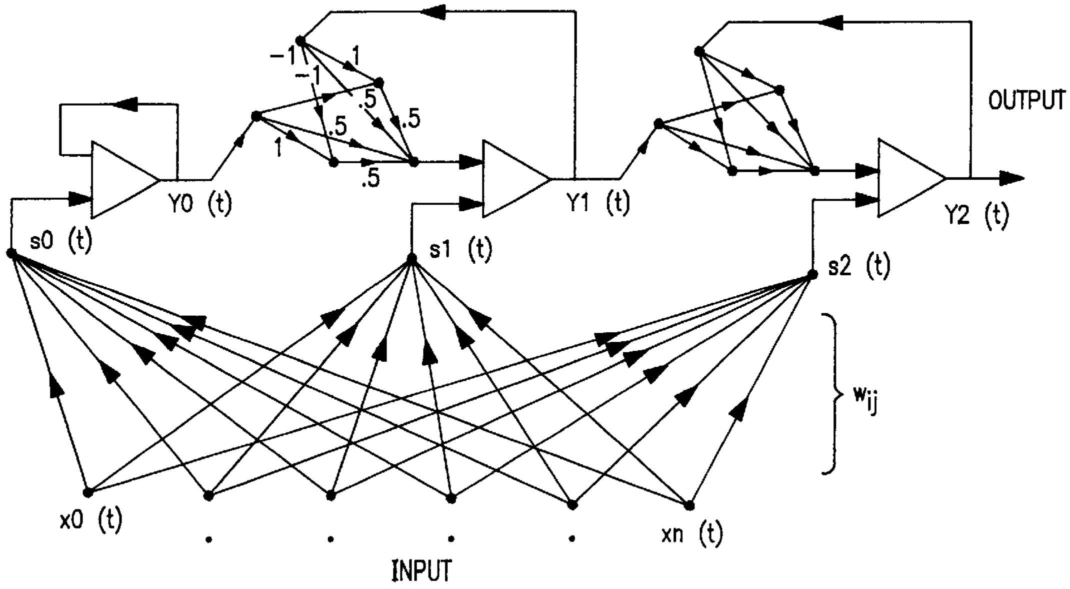
FIG. 17 shows a schematic diagram of a Viterbi network executing the Viterbi algorithm.

FIG. 17 shows an example of a Viterbi network to execute dynamic time warping with the Viterbi algorithm. Discrimination nodes indicated by a triangle have functions of a threshold logic and a delay, and correspond to the state of HMM. The threshold logic outputs 0 if the total sum of all input values is below zero, and the threshold logic value as it is if otherwise. Of the discrimination nodes shown, the upper node outputs the threshold logic value and the lower node outputs the total sum of inputs. For a time series pattern having a length T, $x_j$ (t) ($0 \leqq j \leqq N-1$, $1 \leqq t \leqq T$) (where $X_N(t)$ is a offset value) is inputted to an input unit for each time (frame). A target output value is given by an output value $Y_{N-1}(T)$ at an end node. $s_i(t)(0 \leqq i \leqq M-1)$ represents a collation score between the current input pattern and an expected value of the discrimination unit i. If the input may be assumed to have multi-dimensional uncorrelated Gauss distribution, the expected value of the discrimination unit i could be defined by a means value $m_{ij}$ and a variance $\delta_j^2$. A link $w_{ij}$ between $X_j$ and the discrimination node i and the collation score are defined below:

$$\omega_{iN} = -\sum_{j=0}^{N-1} \frac{m_{ij}^2}{\delta_j^2} \quad (0 \leqq i \leqq M-1) \tag{27}$$

$$\omega_{ij} = \frac{2m_{ij}}{\delta_j^2} \quad (0 \leqq i \leqq M-1, 0 \leqq j \leqq N-1) \tag{28}$$

$$s_i(t) = \sum_{j=0}^{N-1} \frac{2m_{ij}x_j(t) - m_{ij}^2}{\delta_j^2} \quad (0 \leqq i \leqq M-1) \tag{29}$$

If $s_i(t)$ agrees with the expected value, it takes a larger positive value.

The Viterbi network updates the output value at the end node using the regressive equations below:

$$y_o(t+1) = f[s_o(t+1) + y_o(t) + \log(a_{oo})] \quad (0 \leqq t \leqq T-1) \tag{30}$$

$$y_i(t+1) = f\left[ s_i(t+1) + \max_{i-1 \leqq k \leqq i} \{y_k(t) + \log(\alpha_{ki})\} \right] \tag{31}$$

$$(0 \leqq t \leqq T-1, 1 \leqq i \leqq M-1)$$

where $a_{ij}$ corresponds to state transition probability in HMM and f(α) is a threshold function (if α≦0, f(α)=0, if α>0, f(α)=α). Maximum value calculation in the above equation is executed by 5 nodes on the upper side of each discrimination node in the figure (notice that weighing factors are shown in the figure, but the addition term of $\log_{ij}$ is omitted). The network is configured for each category (unit), and its mean value, variance value and transition probability are estimated using the F-B algorithm.

With a speech recognition experiment of 35 words uttered by specified speakers, the accuracy (over 99%) almost the same as HMM is obtained by the Viterbi network having 15 discrimination nodes.

Figure 18:
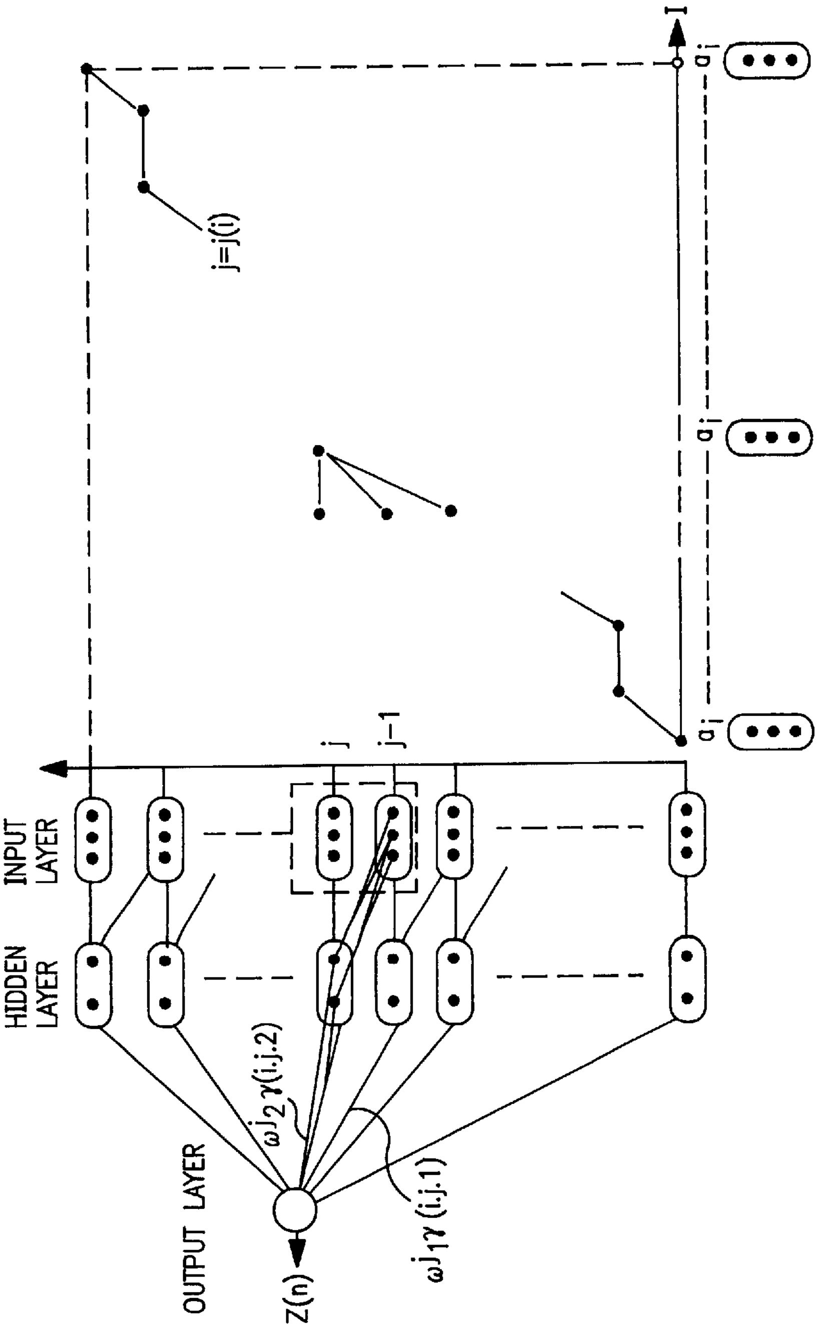
FIG. 18 shows a schematic diagram of a dynamic neural network.

FIG. 18 shows an example of a neural network in which an output layer comprises an unit. According to the general definition, an output value at this time is given by:

$$Z(n) = \sum_{j=1}^{J} \sum_{k=1}^{K} \omega_{jk} \cdot \gamma(i, j, k) \tag{32}$$

where K is the number of units of each unit group in the hidden layer, $W_{jk}$ represents the strength of a line between the k-th unit of the j group and the output unit, and (i, j, k) is an output value of the k-th unit of the j group in the hidden layer when input patterns $a_i$ and $a_{i-1}$ are inputted to the j and j-1 groups in the input layer; in usual cases, i=j. In order to normalize a pattern length of the time series pattern, the output value in the dynamic neural network is defined below:

$$Z(n) = \max_{j=j(i)} \sum_{i=1}^{I} \sum_{k=1}^{K} \omega_{j(i)k}\gamma(i, j(i), k) \tag{33}$$

or $$Z(n) = \max_{i=i(j)} \sum_{j=1}^{I} \sum_{k=1}^{K} \omega_{jk}\gamma(i(j), j, k) \tag{34}$$

where j(i) or i(j) is a time normalizing function in the DP matching. The dynamic programming can be applied to the above equation and, as a result, the asymptotic equation equivalent to the DP matching is obtained. Learning of the neural network may be performed by normalizing time lengths of the training samples, different from one another, with the DP matching in advance.

In principle, since this technique includes the DP matching method, various algorithms for continuous speech recognition in the DP matching can be applied directly. This technique can be interpreted as performing, based on the time series pattern containing 2 frames as one set, the usual DP matching for the time series pattern after feature extraction (non-linear conversion) to maximize the separation between categories. This concept of feature extraction can be also applied to the HMM method. However, this technique using the normal learning process still has room to be improved; the output value of the network is not additive unlike the accumulated distance in DP matching and the accumulated output probability in HMM (because the optimum weight is determined for the entire pattern zone), and the number of times of additions required for calculating the output value is different from the number of times of additions for learning depending on lengths of the input patterns.

Because a neuron model is the form of a numerical model of neural cells (neurons) as basic components of a nerve circuit is closely related with a finite status automation or a probability finite status automaton, it is thought feasible to join the neural network and HMM.

As one example, a probability status machine capable of discriminating many categories by one HMM is described here. From among the established formulae with the probability finite status automaton of HMM, $\pi_t$ is defined below:

$$\pi_t = P(y_1, y_2, \ldots, y_1|M) = \pi_0 \tilde{P}(y_1)\tilde{P}(y_2) \ldots \tilde{P}(y_t) \quad (35)$$

The i-th element of $\pi_t$ represents probability that the machine takes a state i when observed until time t. Assuming now that a target value of each state at the end time T is $\pi$, $$E = f(\pi_\tau - \pi) = \sum_i f(\pi_{\tau i} - \tilde{\pi}_i) \quad (36)$$

expression an error function. Parameters are estimated so that this error is minimized. Note that f is a non-linear threshold function. At this time, by allocating different final states to respective categories like the neural network, HMM capable of discriminating many categories by one machine can be constituted.

Assuming that E(n) $\tilde{P}^t$ (n) and $\pi$ (n) are an error after the n-th learning, a probability matrix and an initial state probability vector, respectively, formulae for re-establishing the parameters are given below with the method of gradient descent:

$$\tilde{P}^t(n+1) = \tilde{\tilde{P}}^t(n) - a \sum_k \nabla_{\tilde{P}_t} E(n) \quad (37)$$

$$\pi_0(n+1) = \pi_0(n) - a \sum_k \nabla_{r_0} E(n) \quad (38)$$

where k is a training sample and $\blacktriangle_x$ is a Hamilton operator representing a partial-differential arithmetic for each element of x.

This machine may be applied to continuous spoken words by converting the learning algorithm such that a value of the target state is set to 0 in the word and 1 at the end of the word zone (word boundary).

Returning to FIG. 1A, a dynamic programming method (hereinafter called "DP") using statistical distance index is used for the-recognition of the semivowels in step S8. This method is described in a thesis (Isolated Word Recognition Using DP Matching And Maharanobis Distance, Journal of Electro-Communication, January 1983, Vol. J66-A, No. 1, pp. 64–70) in detail under the name of Maharanobis DP. Although this thesis describes the word recognition method, this method is applied in this embodiment using the initial and the terminal ends of semivowels obtained by the segmentation in the step S1 as the initial and the terminal ends of DP.

This method will now be described.

Recognition of spoken words limited in vocabulary for specified speakers can be made with a satisfactory degree of accuracy by using the DP matching technique. But a sufficient recognition score is not always obtained for words spoken by a number of unspecified speakers. This is presumably because the DP matching can satisfactorily normalize differences in duration of phonemes depending on the individual words, but cannot satisfactorily normalize differences in features of phonemes depending on the speakers.

In a conventional spoken word recognition system using DP matching, the following measures have been adopted to cope with voices spoken by a number of unspecified speakers:

i) preparation of a plurality of reference patterns for each category;

ii) application of the DP matching to a spectrum; and iii) use of averaged reference patterns.

With the method i), as the number of reference patterns increases, the memory capacity for storing the reference patterns and the quantity of calculations necessary for matching are increased correspondingly. Also, the method ii) requires a sufficient number of spectrum dimensions to enable application of the DP matching to the spectrum. This increases both the required storage capacity and the quantity of calculations to be executed for the DP matching of the spectrum. In contrast, the method iii) needs the storage capacity and the quantity of calculations comparable to those in a system designed for specified speakers.

A DP method will now be discussed which makes use of the merit of the method iii) and utilizes the Maharanobis' distance of each feature parameter for improving the degree of accuracy. With no need of handling the feature parameters in the form of spectrum, this method can reduce the number of dimensions of the parameters, thus resulting in a remarkable decrease in the quantity of both calculations and data to be stored.

The algorithm for DP matching using the Mahalanobis' distance, will first be discussed, then the feature parameters and a process of reducing the number of dimensions of the parameters by a vowel recognition experiment will be explained, and finally the parameter and the algorithm will be applied to the recognition of 10 spoken digits, thereby revealing the effectiveness of this method.

Suppose that a spoken word can be expressed by a series of feature vectors, one spoken word $X^{(s)}$ belonging to a word class s is represented by:

$$X^{(s)} = x_1^{(s)} x_l^{(s)} \ldots x_j^{(s)} \ldots x_J^{(s)} \quad (39)$$

$$x_j^{(s)} = (x_{ij}^{(s)}, x_{2j}^{(s)}, \ldots, x_{Nj}^{(s)})^T \quad (40)$$

where j is the frame number, J is the total number of frames, and N is the number of dimensions of the feature vectors. Let it be assumed that the respective feature vectors in Equation (39) are statistically independent of one another and distributed as expressed by the following Equation (41):

$$b_j^{(x)}(x_j^{(a)}) = \frac{1}{\sqrt{(2x)^N |V_j^{(a)}|}} \cdot \exp\{-\alpha(x_j^{(a)} - x_j^{(a)})^T (V_j^{(a)})^{-1} (x_j^{(a)} - x_j^{(a)})\} \quad (41)$$

where $$\bar{x}_j^{(a)}$$

is a mean vector $$X_j^{(a)}, V_j^{(a)}$$

is a variance-covariance matrix, $\alpha$ is a constant, and a symbol T represents a transposition.

When a spoken word A is observed below:

$$A = a_1 a_2 \ldots a_i \ldots a_I \quad (42)$$

$$a_i = (a_{1i}, a_{2i}, \ldots, a_{Ni})^T \quad (43)$$

likelihood L (A, s) of the spoken word A for the word class s is given by the following Equation (44):

$$L(A,s) = \max_F B(A,F;s) \quad (44)$$

$$B(A,F;s) = \prod_{k-1}^{K} b_{j(k)}^{(a)}(a_{i(k)}) \quad (45)$$

$$F = c(1)c(2) \ldots c(k) \ldots c(K) \quad (46)$$

$$c(k) = (i(k),j(k)) \quad (47)$$

Accordingly, the word class to which A belongs is determined as $s_M$ satisfying the following equation:

$$L(A.\ s_M)=\max L(A.\ s) \quad (48)$$

Reconsider it by taking a logarithm of Equation (44) and adding a negative sign as follows:

$$D_1(A,s) = \min_F [-\ln B(A,F;s)] \quad (49)$$

$$= \min_F \sum_k \{\alpha(a_{i(k)} - x_{j(k)}^{(a)})^T (V_{j(k)}^{(a)})^{-1} \cdot (a_{i(k)} - x_{j(k)}^{(a)}) + e_k^{(a)}\} \quad (50)$$

$$e_k^{(a)} = \frac{1}{2} \ln(2x)^N |V_{j(k)}^{(a)}| \quad (51)$$

Upon approximation of to be constant with respect to k, $D_1$ (A, s) is equivalent to:

$$D_2(A,s) = \min_F \sum_k \alpha(a_{i(k)} - \bar{x}_{j(k)}^{(a)})^T (V_{j(k)}^{(a)})^{-1} (a_{i(k)} - \bar{x}_{j(k)}^{(a)}) \quad (52)$$

Equation (52) can be effectively solved with the usual DP matching algorithm b using the Mahalanobis' distance;

$$d(i,j)=(\alpha_i-\bar{x}_j^{(a)})^T\ (V_j^{(a)})^{-1}\ (\alpha_i-\bar{x}_j^{(a)}) \quad (53)$$

as a frame-to-frame distance. In this case, the word class to which A belongs is determined as $s_M$ satisfying the following equation:

$$D_2\ (A,\ s_M)=\min D_2\ (A,\ s) \quad (54)$$

Thus, the DP matching method using the Mahalanobis' distance gives a matching process which maximizes the likelihood under the assumption of Equation (41) and the approximation of Equation (52).

Particularly, taking an approximation that diagonal components of an inverse matrix of the variance-covariance matrix are all 1 and other components are all 0, $D_2$ (A, s) becomes:

$$D_3(A,s) = \min_F \sum \alpha \| a_{i(k)} - \bar{x}_{j(k)}^{(a)} \|^2 \quad (55)$$

which is equivalent to the spoken word recognition method based on the usual DP matching process in which a series of the mean victors is used as a reference pattern.

Figure 19:
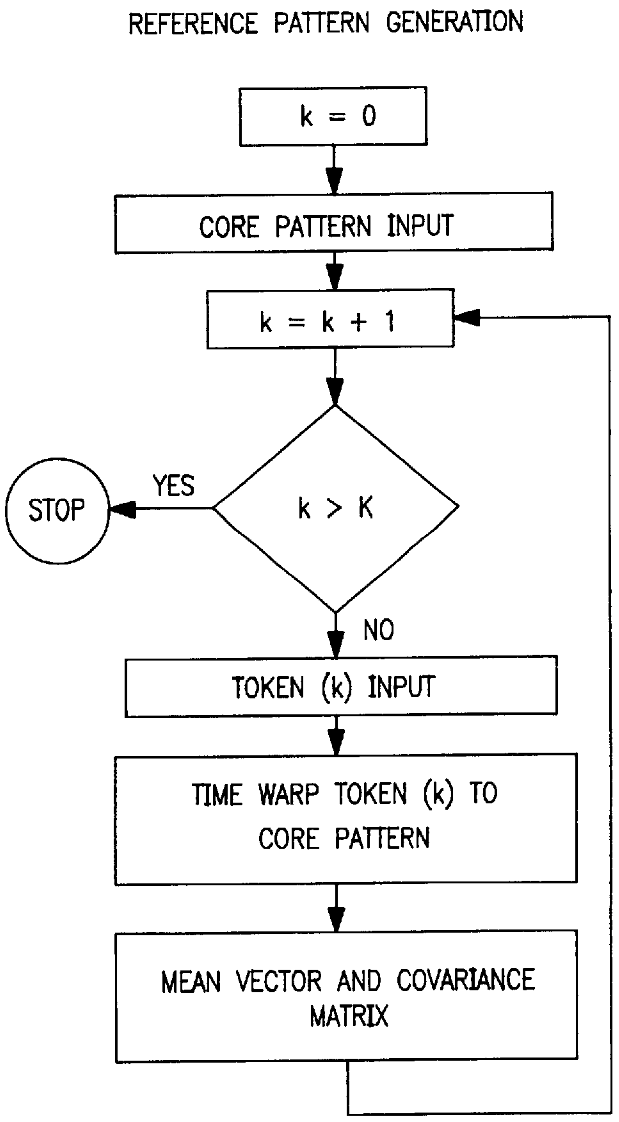
FIG. 19 shows a flowchart of a process for generating a reference pattern.

In the DP matching process using the Mahalanobis' distance, a series of the means vectors and the variance-covariance matrix are used as a reference pattern. FIG. 19 shows a flowchart for generating the reference pattern. The reference pattern is generated for each word class. Let is be supposed that the spoken word has been subjected to acoustic analysis and converted into a series of the feature vectors.

First, one spoken word belonging to the relevant word class is inputted and stored until the reference pattern generation is ended. The resulting pattern is called a core pattern and employed to allocate a frame of another spoken word belonging to the same word class and used for generating the reference pattern.

Next, another spoken word for generating the reference pattern is inputted. This spoken word and the core pattern are subjected to expansion matching about the time base to generate a means vector and a variance-covariance matrix for each from along the matching path at which the time normalized distance is minimized. The DP matching is used as a method for the expansion matching about the time base and the linear expansion matching about the time base is used for comparison purpose.

A next spoken word for generating the reference pattern is inputted and subjected to expansion matching about the time base with the core spectrum for generating a new mean vector and a variance-covariance matrix for each frame from the previous mean vector and variance-covariance matrix. Assuming that as to the k-th input word, a feature vector for a certain frame, and updated mean vector and variance-covariance matrix for the same frame are respectively expressed by:

$$x^{(k)} = (x_1^{(k)}, x_2^{(k)}, \ldots, x_n^{(k)}, \ldots, x_N^{(k)})^T \quad (56)$$

$$\bar{x}^{(k)} = (\bar{x}_1^{(k)}, \bar{x}_2^{(k)}, \ldots, \bar{x}_n^{(k)}, \ldots, \bar{x}_N^{(k)})^T \quad (57)$$

$$V^{(k)} = (V_{mn}^{(k)}) \quad (58)$$

the updating is performed using Equations (58)–(63) below: In case of k=1, $$\bar{x}_n^{(1)} = x_n^{(1)} \quad (59)$$

$$V_{mn}^{(1)} = 0 \quad (60)$$

In case of k≧2, $$\bar{x}_n^{(k)} = \bar{x}_n^{(k-1)} + d_n^{(k)}/k \quad (61)$$

$$V_{mn}^{(k)} = \frac{k-2}{k-1} V_{mn}^{(k-1)} + \frac{1}{k} d_m^{(k)} d_n^{(k)} \quad (62)$$

where $$d_n^{(k)} = x_n^{(k)} - \bar{x}_n^{(k-1)} \quad (63)$$

Thereafter, subsequent spoken words for generating the reference pattern are inputted one by one to update the means vector and variance-covariance matrix.

By so doing, it is only required to stored the series of means vectors and variance-covariance matrices for the speakers so far registered. Also, it is easy to register new speakers.

Because the variance-covariance matrix is a symmetric matrix, the quantity of data actually stored in about a half the number of matrix elements.

The DP matching herein used is free at both start and end points, but is limited in gradient.

Assuming that the distance between the j-th frame of a spoken word X and an i-th frame of the spoken word A is d(i, j) and the accumulated distance from a point (1,1) to a ping (i, j) is g(i, j), asymptotic formulae are given by the following Equations (64)–(67):

$$g(1,1)=2d(1,1) \quad (64)$$

$$g(i,1)=g(i-1,1)+d(i,1),\ 2\leq i\leq R_1 \quad (65)$$

$$g(1,j)=g(1,j-1)+d(1,j),\ 2\leq j\leq R_1 \quad (66)$$

$$g(i,j)=\min\left\{\begin{array}{l} g(i-1,j-2)+2d(i,j-1)+d(i,j) \\ g(i-1,j-1)+2d(i,j) \\ g(i-2,j-1)+2d(i-1,j)+d(i,j) \end{array}\right. \quad (67)$$

where $R_1$ is the degree of freedom at the start point.

In generating the reference pattern, an absolute value distance:

$$d(i,j)=\sum_i |a_{1i}-x_{1j}| \quad (68)$$

is employed as the frame-to-frame distance d(i,j). Here, $x_j$ and $a_i$ are -th components of the respective feature vectors of the j-th frame of the core pattern and the i-th frame of the spoken word for generating the reference pattern. The reasons of using the absolute value distance is that it requires fewer calculations. For the recognition operation, Equation (53) representing the Mahalanobis' distance is used.

The time-normalized distance is given by:

$$D(A,X)= \quad (69)$$

$$\min\left\{\min_{J-R_2\leq j\leq J} g(1,j)/(1+j),\ \min_{I-R_2\leq i\leq I} g(i,j)/(i+J)\right\}$$

where I and J are respectively the total numbers of frames of the spoken words A and X, and $R_2$ is the degree of the freedom of the end point.

In an experiment explained later, $R_1$ was set to 6 (=60 ms), and $R_2$ was set to 0 in the reference pattern generation operation and 6 in the recognition operation. The size R of a limiting window employed to reduce the quantity of calculations is set as follows to be dependent on I and J:

$$R=|I-J|+R_2+1 \quad (70)$$

However, if $R<R_1$ holds, R is set equal to $R_1$.

The i-th frame of the spoken word A corresponding to the j-th frame of the spoken word X is given by:

$$i=\left[\frac{I-1}{J-1}j+\frac{J-I}{J-1}+0.5\right] \quad (71)$$

where [*] indicates the maximum integer not exceeding the number determined by itself.

The frame-to-frame distance d(i,j) is given by the following Euclidean distance:

$$d(i,j)=\sqrt{\sum_l (a_{li}-x_{lj})^2} \quad (72)$$

in the reference pattern generation and by Equation (15) in the recognition process.

The greater the number of distances of the feature parameters, the greater will be both the memory capacity required for storing the reference pattern and the quantity of calculations to be executed for the recognition. It is therefore needed to properly select the feature parameters and reduce the number of dimensions thereof.

Here, the Mel Sone spectrum (hereinafter abbreviated as MS) is used as a spectrum parameter, the Fourier transform technique (hereinafter abbreviated as FMS) and the KL conversion technique are compared as a number-of-dimensions reducing method with each other by a vowel recognition experiment. Those techniques are also compared with the CEPstrum which is a reversed Fourier transform of the logarithmic spectrum.

Twenty terms of MS obtained from the voice waves by 256-point fast Fourier transform (FFT) are expressed by S(k), k=0–19.

The Fourier transform $S_p(n)$, n=0–N of MS is given by the following equation:

$$S_F(n)=\frac{1}{N}\sum_{k=0}^{N-1}\hat{S}(k)e^{j\frac{2n}{N}kn} \quad (73)$$

where $$\hat{S}(0)=S(0) \quad (74)$$

$$\left.\begin{array}{l}\hat{S}(k)=S(k)\\ \hat{S}(N-k+1)=S(k)\end{array}\right\}1\leq k\leq 19 \quad (75)$$

$$\hat{S}(k)=S(19),\quad 20\leq k\leq N-19 \quad (76)$$

Equation (73) was calculated through FFT on assumption of N=64.

In the KL conversion, each term is divided by a mean value of the respective terms of MS to normalize the magnitude of sound and, thereafter, the variance-covariance matrix is calculated. Eigenvectors of the variance-covariance matrix:

$$E^{(n)}=(E_0^{(n)}, E_k^{(n)}, \ldots, E_{19}^{(n)})^T\ n=0\sim 19 \quad (77)$$

and an eigenvalue corresponding to each eigenvector is calculated. Note that n represents the order of the eigenvalues from the largest. The KL conversion $S_{KL}(n)$, n=0–19 of MS is given by:

$$S_{KL}(n)=\sum_{k=0}^{19}\hat{S}(k)\cdot E_k^{(n)} \quad (78)$$

where Ŝ(k) is a MS having the normalized size.

The CEPstrum C(n), n=0–N–1 is given by:

$$C(n)=\frac{1}{N}\sum_{k=0}^{N-1}\hat{S}\ln|F(k)|e^{j\frac{2x}{N}kn} \quad (79)$$

where F(k) is a discrete Fourier transform of the voice. N=256 was set in this experiment.

Each feature parameter is assumed to be expressed in the form of vector. For example, FMS is expressed by:

$$S_F=(S_F(0), S_F(1), S_F(n), \ldots, S_F(N-1))^T \quad (80)$$

Considering a vector:

$$\overline{S}_F=(S_F(N_{ST}), S_F(N_{ST}+1), \ldots, S_F(N_{ED-1}), S_F(N_{ED}))^T \quad (81)$$

comprising a part of components of the above vector, the differences in the recognition score depending on how to set the start dimension $N_{ST}$ and the end dimension $N_{ED}$.

Japanese vowels or monophthongs /a/, /i/, /u/, /e/, /o/ uttered once by thirty-six adult male speakers were used as data for a recognition experiment.

Each voice wave was passed through a low-pass filter of 5 kHz and quantizied with a sampling frequency of 10 kHz and a 12-bit accuracy. Four frames in the vicinity of a maximum power point were subjected to a black-man window of 25.6 ms with intervals of 12.8 ms and then to power spectrum analysis through FFT for averaging those four frames. Both MS and CEPstrum were calculated from the averaged power spectrum.

A mean vector and a variance-covariance matrix for each vowel class were created from all the data of the thirty-six speakers to produce a reference pattern. The Mahalanbois' distance between the input pattern and the reference pattern for each class was calculated, and the vowel class giving the minimum distance is selected as the recognition result. Here, all the data were used for the recognition.

Figure 2:
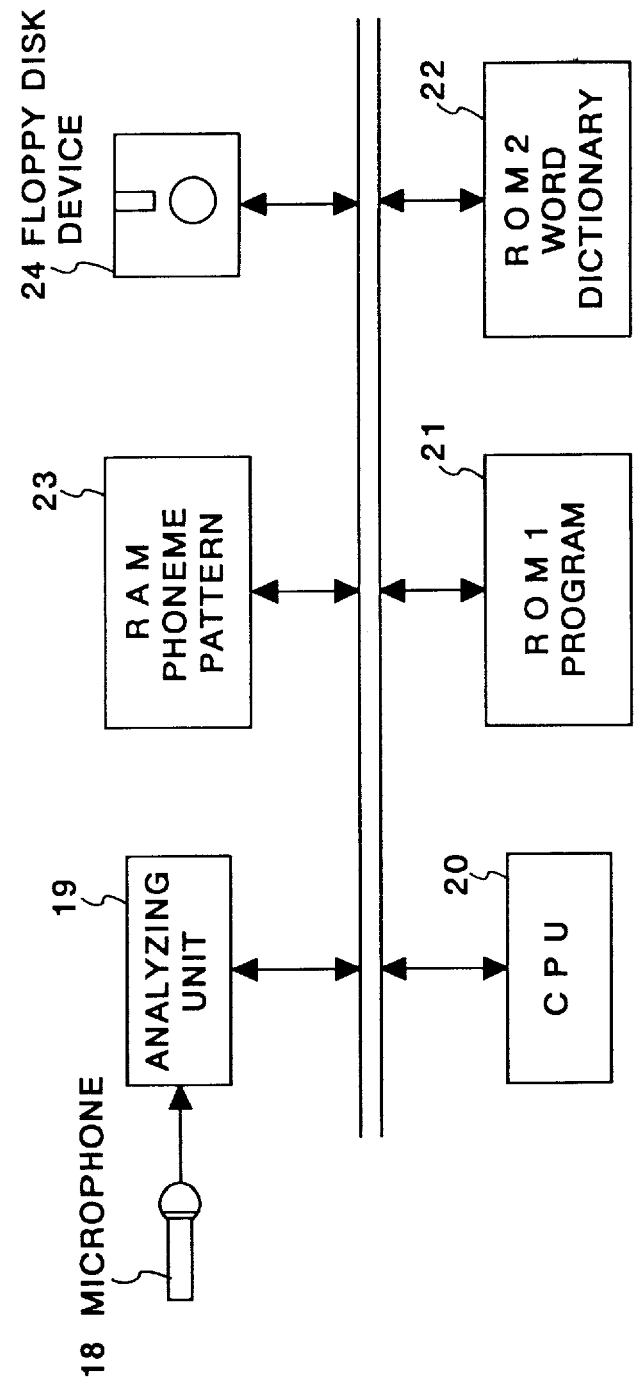
FIG. 2 is a block diagram showing a structure of the speech recognition apparatus in accordance with the present invention.
Figure 20B:
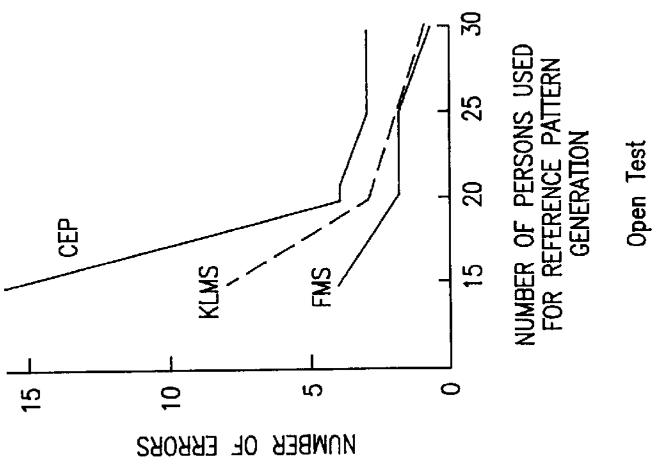
FIG. 20(*a*) shows graphs of the results of a closed test on vowel recognition and FIG. 20(*b*) shows a graph illustrating the results of an open test for vowel recognition.
Figure 20A:
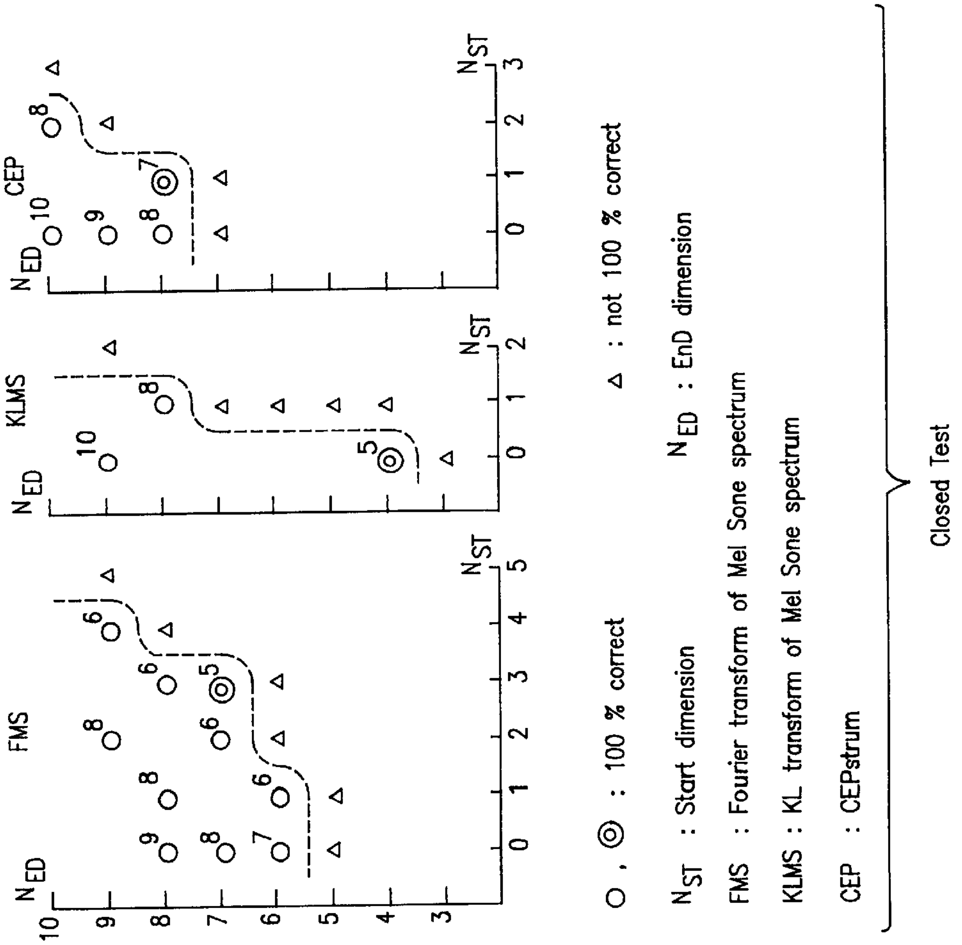

FIG. 20(*a*) shows the results of respective experiments made by changing the number of dimensions of the feature vectors. In FIG. 2(*a*), superscripts added to the mark ○ represent the number of dimensions (=$N_{ED}$–$N_{ST}$+1), and the mark ∂ represents the minimum number of dimensions at which the recognition score of the feature parameter becomes 100%. That minimum number of dimensions is smaller in the Fourier transform (FMS) and the KL conversion (KLMS) of the Mel Sone spectrum than in the CEPstrum (CEP).

A reference pattern (mean vector variance-covariance matrix) was generated from a part of the data for thirty-six speakers and used for the recognition of other data. The dimensions of the respective feature parameters were given by a combination of the minimum numbers of dimensions each of which provided the recognition rate of 100% in a closed test. The eigenvector for the KL conversion was determined using the data for generating the reference pattern.

FIG. 20(*b*) shows the experimental results. Comparison between KLMS and FMS reveals that as the data for generating the reference pattern is reduced, the extent of misrecognition becomes smaller in FMS than in KLMS.

From the above results, it was decided to use the Fourier transform of the Mel Sone spectrum (FMS) for the spoken digit recognition.

Japanese 10 digit words /itʃi/./ni/./san/./yon/./go/ /roku/./nana/./hatʃi/./ku/./rei/ uttered three times by eight adult male speakers, i.e., 240 utterances in total, were used as data for a recognition experiment.

Each voice wave was passed through a low-pass filter of 5 kHz and quanitized with a sampling frequency of 10 kHz and 12-bit accuracy. The start and end points of a voice zone was detected by a known method. The voice zone was subjected to a black-man window with frame intervals of 10 ms and a frame length of 25.6 ms, and then to power spectrum analysis from the start to end point through FFT. The resulting power spectrum was converted into a series of MS, which was subsequently Fourier transformed to obtain a series of FMS.

For the purpose of evaluating the performance of FMS and reviewing the dimensions thereof in the spoken 10 digit recognition, a recognition experiment was performed using the series of FMS directly as the reference pattern.

The reference pattern for each word class and the input word were subjected to DP matching (frame-to-frame distance; Equation (68), $R_1$–$R_2$=6) and the time-based linear expansion matching (frame-to-frame distance; Equation (72)). The word class giving the minimum distance was selected as the recognition result. For each speaker, one of three sets of 10 spoken digits was used as the reference pattern to recognize the other two sets. A similar recognition experiment was performed three times by changing the reference pattern in turns.

Figure 21:
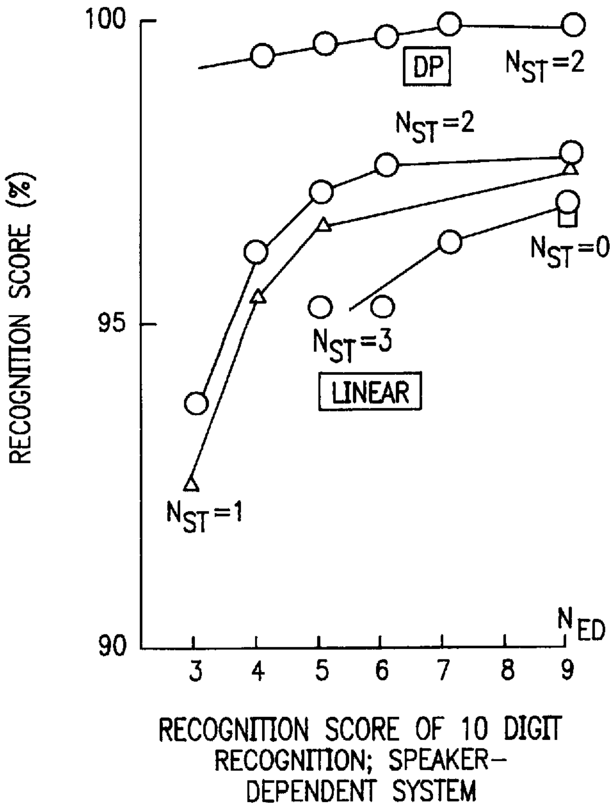
FIG. 21 shows a graph showing the recognition score for a ten digit recognition speaker-dependent system.

FIG. 21 shows the results of the experiments conducted while shifting a combination of dimensions. The recognition score is a mean score for the eight speakers.

In case of the time-base linear expansions LINEAR, the result comparison between respective combinations of dimensions having the same number of dimensions (=$N_{ED}$–$N_{ST}$+1) reveals that the recognition score is higher in case of $N_{ST}$=2 than in cases of $N_{ST}$–0, 1, 3. With $N_{ST}$ fixed, the recognition score is raised with the larger number of dimensions. Thus, exclusion of the 0-th and 1-st components results in the higher recognition score.

Since the 0th component is a mean value of MS, exclusion of the 0-th component is equivalent to normalizing the mean value of MS to 0 for each frame (i.e., normalization of the magnitude of sound). Also, since the 1-st component represents a rough gradient (added with a negative sign) for MS, exclusion of the 1-st component is equivalent to normalization of the sound source characteristics of the vocal cord. It can thus be said that the above results prove the effect of normalizing the magnitude of sound and the sound source characteristics of the vocal cord.

In case of the DP matching DP, an experiment was conducted for $N_{ST}$=2 in view of the results of the time-base linear expansion. With this experiment, the recognition score is higher than 99% at $N_{ED}$=4 and 100% with $N_{ED}$ being 7 or more.

From the foregoing, it was decided to use the second or higher-order components of FMS for the recognition in subsequent experiments.

A reference pattern, in another experiment, for each word class was prepared by setting one set data of one person among eight speakers as the core parameter, and using the method explained earlier. The matching was performed using the Mahalanobis' distance between an input word and each reference pattern, and the word class closest to the input word was selected as the recognition result.

A closed test on data was performed. A reference pattern was prepared using all of the data, and all the data was recognized using the time-base linear expansion. The linear expansion matching between the data for generating the reference pattern and the core pattern was performed on the components with $N_{ST}$=0 and $N_{ED}$=9.

The experimental results are shown in Table 1. For comparison, Table 1 also shows the results in the case of using the series of mean vectors as a reference pattern and the Euclidian distance as a frame-to-frame distance. In

TABLE 1

Recognition scores of closed test on 10 spoken digit recognition; time-base linear expansion matching

| | 1 次元数 | |
|---|---|---|
| 2 距離 | 3 ($N_{ST}$ = 2, $N_{ED}$ = 4) | 2 ($N_{ST}$ = 2, $N_{ED}$ = 3) |
| 3 マハラノビス | 99.6% | 96.3% |
| 4 ユークリッド | 94.6% | 90.4% |

1; number of dimensions
2; distance
3; Mahalanobis
4; Euclid

TABLE 2

Recognition scores of 10 spoken digit recognition; open-test on data $N_{ST} = 2$, $N_{ED} = 4$

| | 1 マッチング | |
|---|---|---|
| 2 参照パタン | DP | 3 線形伸縮 |
| A | 98.8% | 95.8% |
| B | 95.6% | 94.4% |

A: 平均ベクトル・分散共分散行列の系列
B: 平均ベクトルの系列
1; matching
2; reference pattern
3; linear expansion
A; series of mean vectors and variance-covariance matrices
B; series of means vectors any of the numbers of dimensions being 2 and 3, the recognition score is higher in the case of using the Mahalanobis' distance than in the case of using the Euclidean distance.

An open test on data was also performed. A reference pattern was prepared and from respective sets of 10 digits spoken by eight speakers, and the other two sets of spoken digits were recognized. A similar recognition test was conducted three times by changing the reference pattern in turns. The number of dimensions of FMS was set to three dimensions ($N_{ST}$=2, $N_{ED}$=4) . The DP matching between the data for generating the reference pattern and the core pattern was performed on the components with $N_{ST}$=0 and $N_{ED}$=9.

The experimental results are shown in Table 2. for comparison, Table 2 also shows the results in the case of using the series of mean vectors as a reference pattern, i.e., the result of Equation (55) (note: the frame-to-frame distance actually used in Equation (41) for DP and Equation (22) for linear expansion). In both cases of DP and linear expansion, A gives a higher recognition score than B. In this respect, the extent of improvement in the recognition score is greater in the case of DP. Further, both cases of A and B, DP gives higher recognition score than the linear expansion. In this respect, the extent of improvement in the recognition score is greater in case of A.

From those results, it is estimated that the combined use of the Mahalanobis' distance (including use of the variance-covariance matrices) and the DP matching allows variations depending on individuals to be absorbed by the variance-covariance matrices and variations in duration of each phoneme to be absorbed by the DP matching, respectively. More specifically, in the case of the generating the reference pattern from only the mean vectors, since the mean vectors also express variations depending on individuals, the feature of each phoneme becomes vague, causing the features of adjacent frames to be closer to each other. Therefore, if the recognition is made using the DP matching, the respective frames cannot be discriminated with high accuracy. Also, in the case of using the linear expansion to perform the matching, since the respective phonemes cannot be discriminated in the reference pattern generation with high accuracy, the variance-covariance matrix for the frame of interest represents not only the feature of a phoneme in the same frame, but also the features of phonemes in neighboring frames. Accordingly, the variance-covariance matrix in this case represents only variations depending on individuals, but also variations in the features of phonemes. Meanwhile, in the case of using the variance co-variance matrix and the DP matching together, since phonemes can be discriminated in the reference pattern generation with high accuracy, variations depending on individuals for the same phoneme reflect on the variance-covariance matrix more exactly. As a result, the frames can be discriminated in the recognition operation with high accuracy.

An open test was then performed on speakers. A reference pattern was prepared from three respective sets of 10 digits spoken by seven speakers, and three sets of 10 digits spoken by the remaining one speaker were recognized. The similar recognition test was conducted eight times by changing the inputting speaker in turns. The number of dimensions of FMS was set to three dimensions ($N_{ST}$=2, $N_{ED}$=4). The DP matching between the data for generating the reference pattern and the core pattern was performed on the components with $N_{ST}$=2 and $N_{ED}$=9.

The result of recognition by the DP matching using the Mahalanobis' distance gave a recognition score of 95.4%. On the other hand, the case of using the series of mean vectors as a reference pattern (frame-to-frame distance; Equation (68)) gave a result of 93.8%.

In addition, by using the FMS series of one set data of one speaker directly as a reference pattern, respective one set data of the other seven speakers was recognized with the DP matching (frame-to-frame distance; Equation (3)), ($N_{ST}$=2, $N_{ED}$=4) . A similar test was conducted eight times by changing the speaker for the reference pattern in turns. The resulting mean recognition score was 87.1%. From this and the above results, it is found that the effect of DP matching using the Mahalanobis' distance is remarkable.

Although sufficient evaluation cannot be made based on only the recognition score because recording conditions of voice data, the extent of control in uttering speeds, etc. are different from evaluation experiments of other systems, the method of this paper is compared below with other technique by referring to also the recognition score as a general guideline.

In the open test on data, as a result of the recognition using the reference pattern generated from respective sets of 10 digits spoken by all the speakers, a recognition score was 95.6% in the case of using the series of mean vectors as the reference pattern, and 98.8% in the case of the DP matching using the Mahalanobis' distance. In the experiment of Yasunaga Niimi "On Standard Pattern In Limited Words Recognition System", Lecture Proceedings Of Japan Acoustic Society, 4-2-18 (Sho51-05), respective sets of 10 digits spoken by all speakers are employed as learning data, and a series of mean vectors is prepared using DP matching which introduces a learning algorithm. As a result of using the series of mean vectors as a reference pattern and recognizing other sets of words spoken by the speaker involved for preparing the learning data, a recognition score of 98.2% is obtained.

However, for the reasons that convergence of the learning algorithm is not proved theoretically in the method of used by Niimi, while the method described above is free from the problem convergence, the present method is believed to be more practical at the present.

With the open test on speakers discussed above, a recognition score of 95.4% was obtained on the supposition of the case of addressing a number of unspecified speakers. Meanwhile, recognition scores 98% and 97.6% have been reported in a method where the DP matching is applied to the spectrum as well.

The following is a comparison in the quantity of calculations between that method and the method presented here. In this method, assuming the number of dimensions of FMS be N, the number of multiplying and adding operations required for one calculation of the frame-to-frame distance are given by N(N−1)/2+3N−1, respectively. Because of N=3, the experiment in 4.2.3 requires 22 operations of the four rules of arithmetic in total. This is almost equal to the quantity of calculations necessary for obtaining the Euclidean distance of 7-dimensional feature vectors. On the other hand, assuming that the degree of freedom of expansion in the direction of the frequency base is $R_f$, the method of applying the DP matching to the spectrum as well requires at least $N.R_f$ operations for each of multiplication and addition. Because this comparative method requires a number of spectrum dimensions over 20[(3)], 120 operations of the four rules of arithmetic in total are required even in case of $R_f=3$ (expansion of ±1). When two or more references patterns are prepared for each word class, the quantity of calculations is further increased. For that reason, the present method is believed to be more practical.

Returning to FIG. 1A, in recognition of other phonemes in step S10, the identification method is used according to the Bayesian decision of changing patterns of spectrum with time. This method is described in detail in "Detection of the Characteristics of Segment Aiming at the Recognition of Segment Type Features For Continuous Speech Recognition", Japanese Acoustics Society, Voice Section, S85-53, December 1985.

This method will now be described. Techniques of recognizing continuous speech are grouped into twos in terms of basic units for the recognition operation. One group is based on units of a word, and the other is based on units of a phoneme, a syllable, VCV, etc. The former technique can avoid such problems as articulatory coupling or segmentation within a word, and can provide a relatively high recognition score. In consideration of the capacity required to store reference patterns and other factors, however, it is not suitable for recognizing of a large size vocabulary to be handled in continuous speech recognition. Meanwhile, the latter technique is believed to be superior because of the reduced number of basic units and generality. Thus, it can be said that setting to finer units is ideal, but recognition based on finer units becomes difficult upon influences by articulatory coupling and the like.

Figure 22A:
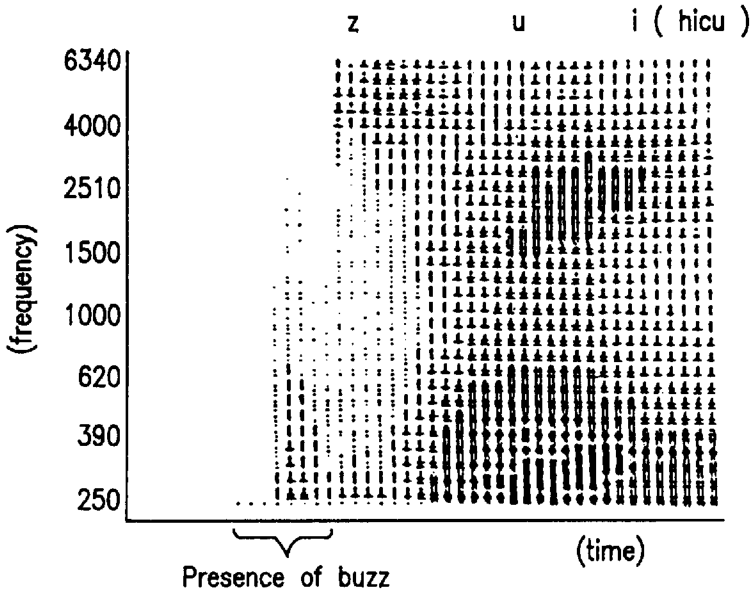
FIG. 22(*a*) is a graph showing an example of fluctuations in the acoustic features of a phoneme /z/ uttered by the same speaker in the presence of buzz, while FIG. 22(*b*) is a graph of the fluctuation in the acoustical features of a phoneme /z/ uttered by the same speaker in the absence of buzz.
Figure 22B:
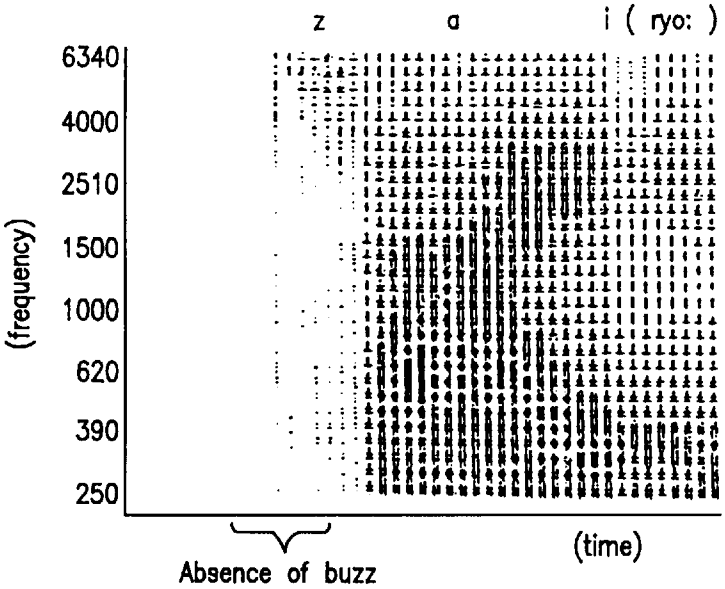

The minimum basic unit generally accepted at the present is a phoneme. However, a phoneme is a linguistical minimum unit capable of discerning the meaning of a word, and is not always correspondent to an actual utterance phenomenon in one-to-one relation. In other words, there exist various allophones and the time-dependent structure is fluctuated. Looking into details of the spectrum of a phoneme /z/, for example, it consists of four portions; buzz—voiced fricative explosion—voiced frication—extended gliding. But, even the phoneme uttered by the same speaker is fluctuated such that the buzz portion may be observed in some cases and not observed in other cases (FIGS. 22(*a*) and 22(*b*)). The conventional phoneme recognition could not cope with such fluctuations because it is designed to recognize a variety of acoustical features present in one phoneme together. Solving that problem requires it to set units which correspond to various acoustical features present in a phoneme.

Therefore, this method sets segment type features as minimum units describing acoustical features present in a phoneme, thereby grasping a time-serial spectrum. These segment type features are believed to be more suitable for describing acoustical features of voice than phonemes regarded as linguistical units. It is here proposed to newly set classes of the segment type features which are used as basic units for continuous speech recognition.

Cited below are advantages in the case of using the segment type features as basic units.

(1) It is easy to set classes which are more compact in terms of acoustics.

(2) Division into finer units than phonemes can alleviate time-dependent influences. Therefore, the recognition is less affected by fluctuations in an uttering speed which raise a problem in the case of recognizing continuous speed.

(3) Phonetic knowledge can be introduced at the stage of converting the segment type features into words. This enables it to cope with fluctuations in acoustical features such as unvocalized vowels which are frequently found in continuous speech.

(4) Individual differences and fluctuations in individual utterances can be processed in a top-down fashion by introducing time-dependent restrictions.

For detection of the segment type features, a Time Spectrum Pattern (TSP) was employed which is able to grasp time-dependent changes in the frequency structure. A method of simultaneously discriminating and classifying the segment type features by TSP will be described. Also, a method of normalizing the likelihood of each feature and representing it by the posteriori probability will be described. With such an addition of the likelihood based on the posteriori probability, it is expected that the distance scale in a word matching section becomes more accurate. This further enables mutual comparison of the respective features which have different scales from each other. Detection of the segment type features was evaluated using total 212 word sets which were employed in designing standard patterns.

The segment type features are minimum units proposed by G. Fant to describe a sound spectrogram. As the kinds of features, there are set three classes representing the features of a sound source and six classes representing the features on articulation of the vocal cords. It may be thought more reasonable to make the observed spectrum correspond to the segment type features than making it directly correspond to phonemes or the like in a forcible manner. In this method, therefore, features were newly set for the purpose of grasping various acoustical features in continuous speech and recognizing the continuous speech with those features used as basic units. A total of 35 kinds of features were set, i.e., 16 kinds of features as stationary ones and 19 kinds of features as transitional ones (Table 3). Because these features are set to be used

TABLE 3

Segment Type Features Set a. stationary features

| 1 番号 | 2 セグメント | 対応する音素 3 |
|---|---|---|
| 1 | vowel | /a/ |
| 2 | | /o/ |
| 3 | | /u/ |
| 4 | | /i/ |
| 5 | | /e/ |
| 6 | dev-vowel | dev/i/, dev/u/ |
| 7 | silent | Q, non-speech |
| 8 | buzz bar | /b/, /d/, /g/ |
| 9 | nasal | /N/, /ŋ/ |
| 10 | 4(鼻音のnasal- | /m/ |
| 11 | murmur) | /n/ |
| 12 | liquid | /r/ |
| 13 | fricative | /z/ の摩擦部 5 |
| 14 | | /h/ |
| 15 | | /s/ |
| 16 | | /c/ |

TABLE 3-continued

Segment Type Features Set b. transitional features

| 1 番号 | 2 セグメント | 6 音素 |
|---|---|---|
| 17 | semi-vowel | /j/ |
| 18 | | /w/ |
| 19 | voiced stop | /b/ |
| 20 | | /d/ |
| 21 | | /g/ |
| 22 | liquid tran. (出わたり)[7] | /r/ |
| 23 | nasal tran. | /の摩擦部/ |
| 24 | (出わたり)[7] | /m/ |
| 25 | | /n/ |
| 26 | unvoiced stop | /p/ |
| 27 | | /t/ |
| 28 | | /k/ |
| 29 | stop fricative | /z/ |
| 30 | [8](破裂部分) | /c/ |
| 31 | head vowel | /a/ |
| 32 | (語頭母音) | /o/ |
| 33 | | /u/ |
| 34 | | /i/ |
| 35 | | /e/ |

1;No. 2;segment 3;corresponding phoneme 4;nasal-murmur of nasal sound 5;fricative portion of /z/ 6;phoneme 7;extended gliding 8;explosive portion as basic units for recognition, the kinds of features are fairly more than the kinds of intrinsic segment type features. The segment type features will be explained below one by one. There are seven stationary features.

(1) vowel

Vowels except voiceless vowels. Properly speaking, nasalized vowels should be also excluded. But these vowels are still included in this feature for convenience of labeling. A total of 5 classes of /a/, /o/, /u/, /i/, /e/ were set.

(2) devocalized vowel

There is a possibility that the vowels succeeding voiceless consonants may be devocalized. In particular, this phenomenon is frequently found in vowels /i/, /u/. Here, devocalized vowels /i/, /u/ were set to one class.

(3) silent

Silent zones before and after a word, and a silent zone before a double consonant or a voiceless explosive were set to one class.

(4) buzz-bar

This represents the feature of buzz portions of voiced explosives /b/, /d/, /g/. It is believed that this feature enables detection of a buzz portion of /z/.

(5) nasal

This represents the feature of a stationary portion of nasal sound. Three classes of /η/, /m/, /n/ were set. Because the feature differences between respective nasal sounds can be thought not so remarkable in the stationary portion of nasal sound, the nasal sound feature is grasped here in a multi-pattern manner. Identification of the respective nasal sounds is performed by the segment feature of nasal transitional. Further, a standard pattern was designed by tentatively including the syllabic nasal /N/ in the class of a nasal sonant /η/.

(6) liquid

A standard pattern was designed using a liquid /r/ except the head one.

(7) fricative

This segment represents the fricative feature. Four classes corresponding to respective frications of /z/, /h/, /s/, /c/ were set.

In addition, there are seven transitional features (numbered 8–14).

(8) semi-vowel

Two classes corresponding to semi-vowels /j/ and /w/ were set.

(9) voiced stop

This represents the feature of explosions of voiced explosives /b/, /d/, /g/.

(10) liquid transitional

A liquid having an explosive pattern. A standard pattern was designed using an extended gliding portion of the head /r/.

(11) nasal transitional

The feature of extended gliding which can be thought as best representing phonemic differences of nasal sounds. Three classes of /η/, /m/, /n/ were set. It is believed that this setting enables discrimination of the respective nasal sounds.

(12) unvoiced stop

This represents the feature of explosions of voiceless explosives /p/, /t/, /k/. Three classes were set.

(13) stop fricative

This represents the feature of explosions of explosive /z/ and /c/. For the explosion of /z/, a standard pattern was designed using data of the head one.

(14) head vowel

A segment representing the feature of head vowels. This was set aiming to reduce additions of explosives to the word head. Further, reference points of the respective features thus set are shown in Table 4.

While the above segment type features can be also set by other techniques such as clustering, they are heuristically set here in view of that the generally grasped phonetic knowledge is positively utilized at the stage of recognition.

Input speech is passed through a 9 KHz low-pass filter, A/D-converted with 24 KHz—12 bits containing a sign, and subjected to frequency analysis using a 29-channel filter bank. The performance of the filter bank used is shown in Table 5. These operations are carried out at a cycle of 10 ms per frame. The resulting 29-dimensional spectrum time-series is logarithmically converted as a pre-processing

TABLE 4 REFERENCE POINTS OF FEATURES a. stationary features (1) vowel: center of stationary portion of vowel (2) devocalized vowel: center of stationary portion of fricative zone (3) silent: center of silent zone (4) buzz-bar: center of stationary portion of buzz of voiced explosive (5) nasal: center of stationary portion of nasal sound (6) liquid: minimum point of power (7) fricative: center of stationary portion of fricative zone b. transitional features (8) semi-vowel: start point of spectrum transition (9) voiced stop: point of explosion

(10) liquid transitional: start point of extended gliding of liquid

(11) nasal transitional: start point of extended gliding of nasal sound

(12) unvoiced stop: point of explosion

(13) head vowel: rising point of power of head vowel

TABLE 5 PERFORMANCE OF FILTER BANK

Filter configuration: digital filter with floating-point arithmetic (32 bit)

Number of channel: 29 channels
Central frequency: 250–630 Hz
Frequency interval: 1/6 octave
Filter characteristics: single peak (Q=6.0)
Analysis cycle: 10 msec/frame In general, there exists a strong correlation between channels in the spectrum obtained by a filter bank with relatively low Q like that used here. Therefore, a technique of orthogonalizing the observed vector by application of the K-L conversion method and reducing the redundancy of an observation space is used. This technique is believed to make it possible to concentrate fluctuating components of the observation space into a lower-dimensional space as far as possible, and to extract the features which are less affected upon abrupt fluctuations.

The K-L conversion method can project an n-dimensional input vector x into an m-dimensional feature space using a linear conversion matrix A of (n×m).

$$\gamma = A^t x \quad (82)$$

This linear conversion matrix A can be determined by solving the eigenvalue problem below:

$$St\alpha - \lambda\alpha = 0 \quad (83)$$

(where St: covariance matrix,λ: eigenvalue, α:eigenvector) Thus, A is constituted by a row vector comprising eigenvalue vectors α1, α2, . . . αm which correspond to the following eigenvalues determined from the above equation:

$$\lambda 1 \geqq \lambda 2 \geqq \ldots \geqq \lambda m \geqq \ldots \geqq \lambda n \geqq 0$$

Figure 23:
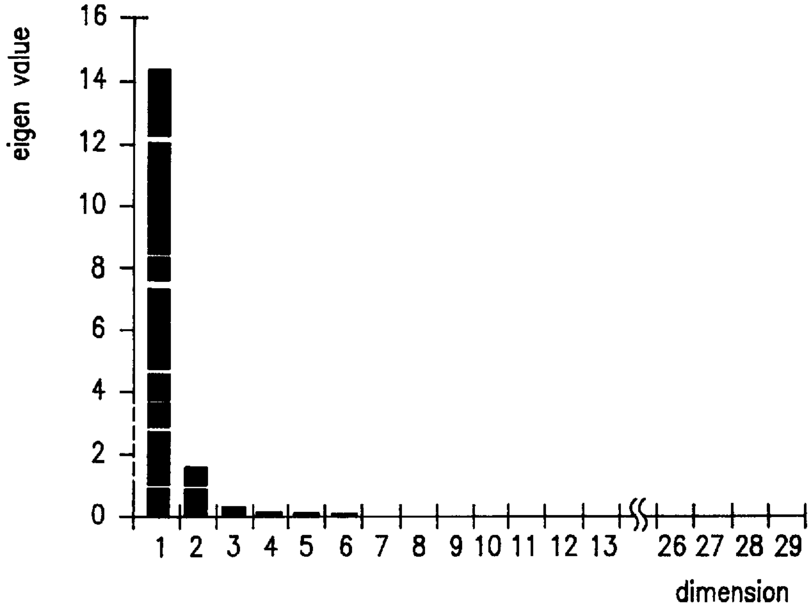
FIG. 23 shows a graph illustrating the eigenvalues for the main components for a device for detecting segment type features for continuous speech recognition.

Through the above technique, an 29-dimensional output is subjected to feature reduction for each frame. The cut-off dimensional number in the K-L conversion was set to the 10-dimension based on results of the eigenvalues (FIG. 23) and the preliminary study. The subsequent study will proceed using this spectrum time-series reduced to 10 dimensions as a basic parameter.

When recognition units are set finer in terms of time, the problems of articulatory coupling and segmentation become significant. In conventional methods designed to perform segmentation and discrimination independently of each other, errors in the respective stages are so accumulated as making it difficult to obtain a satisfactory result. For the reason, the present method adopts a technique of carrying out both segmentation and discrimination while interrelating them. In other words, an independent detection mechanism is provided for each segment type feature, and arithmetic operations are executed in parallel in the direction of time, thereby performing both segmentation and discrimination concurrently.

As this detection mechanism, a time-dependent pattern of spectrum, i.e., Time Spectrum Pattern (TSP), was used which can express frequency information and time information at the same time. This enables time-dependent changes in the spectrum to be expressed in the standard pattern, and is effective particularly in recognizing explosives, etc.

On the assumption that fluctuations attributable to phonemic properties would be present within a sort zone on the order of 30–50 msec and fluctuations depending on individual differences, uttering speeds, context, etc. would be present in a zone over 50 msec, the time width of the Time Spectrum Pattern was tentatively set here to 5 frames (50 msec) for all the features. Of course, it is natural that fluctuations representative of phonemic properties are different for every segment type features and, therefore, it will be required in future studies to set time widths having their lengths different for every feature.

When the time width is set to 5 frames as mentioned above, the number of dimensions of the standard pattern becomes extremely large. In consideration of the quantity of calculations and stability, the features are desirably further reduced. It is also expected that the further reduction eliminates the redundancy and improves the recognition score. This feature reduction is performed by applying the K-L conversion method like above and using a linear conversion matrix common to the respective features. The process of obtaining this matrix requires a covariance matrix for all fluctuations. Aiming to compensate for the maldistribution of sampling numbers, covariance matrices are determined for every segment type features and a mean of those matrices is used as a covariance matrix for all fluctuations. Thus, assuming that the covariance matrix for a segment type feature i is Si and the covariance matrix for the whole is St, the following equation holds:

$$St = (1/N) \sum_{i=1}^{N} Si \quad (84)$$

(where N: number of classes)

A conversion matrix is determined from St and employed to convert the feature amount of 5 [frame]×10 [channel]=50 dimensions into the feature amount of 25 dimensions.

Each segment type feature is extracted using the Time Spectrum Pattern thus set.

For the present, no problem will arise because the Time Spectrum Patterns corresponding to the respective features have the same scale. But, when the pre-processing methods or the time widths are changed for every feature, for example, the scales are different in the features and the respective values cannot be directly compared with each other in calculating the likelihoods. Therefore, a technique will be explained for expressing the likelihood of every feature with a unified scale using posteriori probabilities. The posteriori probability was calculated in two manners as follows.

In the first method the posteriori probability at which an input vector x belongs to a segment type feature i is given below from the Bayes' theorem:

$$P(i|\chi) = \frac{P(\chi|i)P(i)}{\sum_{k=1}^{N} P(\chi|k)P(k)} \quad (85)$$

(where p(x|i): probability function, P(i):prior occurrence probability, N; number of classes) Assuming now that the appearance probabilities of all the segment type features are equal, Equation (85) can be rewritten to:

$$P(i|\chi) = \frac{P(\chi|i)}{\sum_{k-1}^{N} P(\chi|k)} \quad (86)$$

Also, in case of numerous input samples, their distribution approaches to a normal distribution by appropriately setting the segment type features. Accordingly, supposing p(x|i) as a multi-dimensional normal distribution, Equation (86) is turned to:

$$P(\chi|i) = \frac{1}{(2\chi)^{d/2}|Si|^{1/2}} \exp\left\{-\frac{1}{2}(\chi-\mu_i)^t Si^{-1}(\chi-\mu_i)\right\} \quad (87)$$

(where d:number of dimensions, Si:covariance matrix, $\mu i$: mean vector)

From equations (86) and (87), the posteriori probability for each segment type feature can be determined.

In the second method, the distance between the standard pattern and the input vector is defined and then converted into the posteriori probability using a calibration curve. The Mahalanobis' distance was employed here as a distance scale. The Mahalanobis' distance $d^2i$ for a feature i can be expressed below:

$$di^2(\chi) = (\chi - \mu_i)^t Si^{-1}(\chi - \mu_i) \quad (88)$$

Considering the case where the input vector x belongs to the class of interest or not, i.e., it belongs to either one of only two classes i and $\bar{i}$, Equation (86) is rewritten to:

$$P(i|\chi) = \frac{P(\chi|i)}{P(\chi|i) + P(\chi|\bar{i})} \quad (89)$$

First, distance distributions of the two classes relative to the standard pattern are examined from the labeled input, thereby determining probability functions p(x|i) and p(x|$\bar{i}$). The calibration curve for the posteriori probability with respect to the Mahalanobis' distance is then obtained using Equation (89). Thus, the posteriori probability is added by referring to that curve in a table-look-up manner. This method has a feature that it requires no assumption of normal distribution like the first method. The posteriori probabilities are calculated for every frame by the above two methods.

Figure 24:
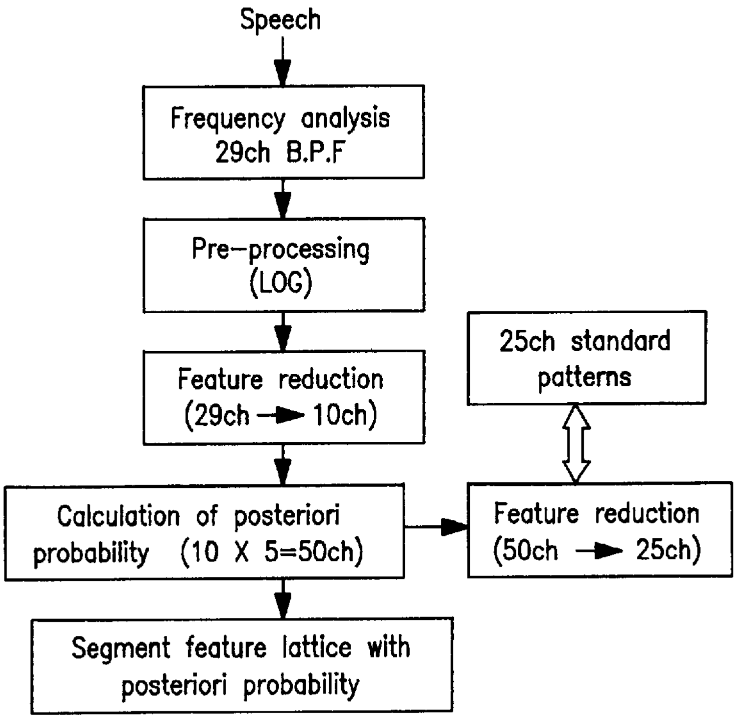
FIG. 24 illustrates a flowchart of a method for detecting segment type features.
Figure 25:
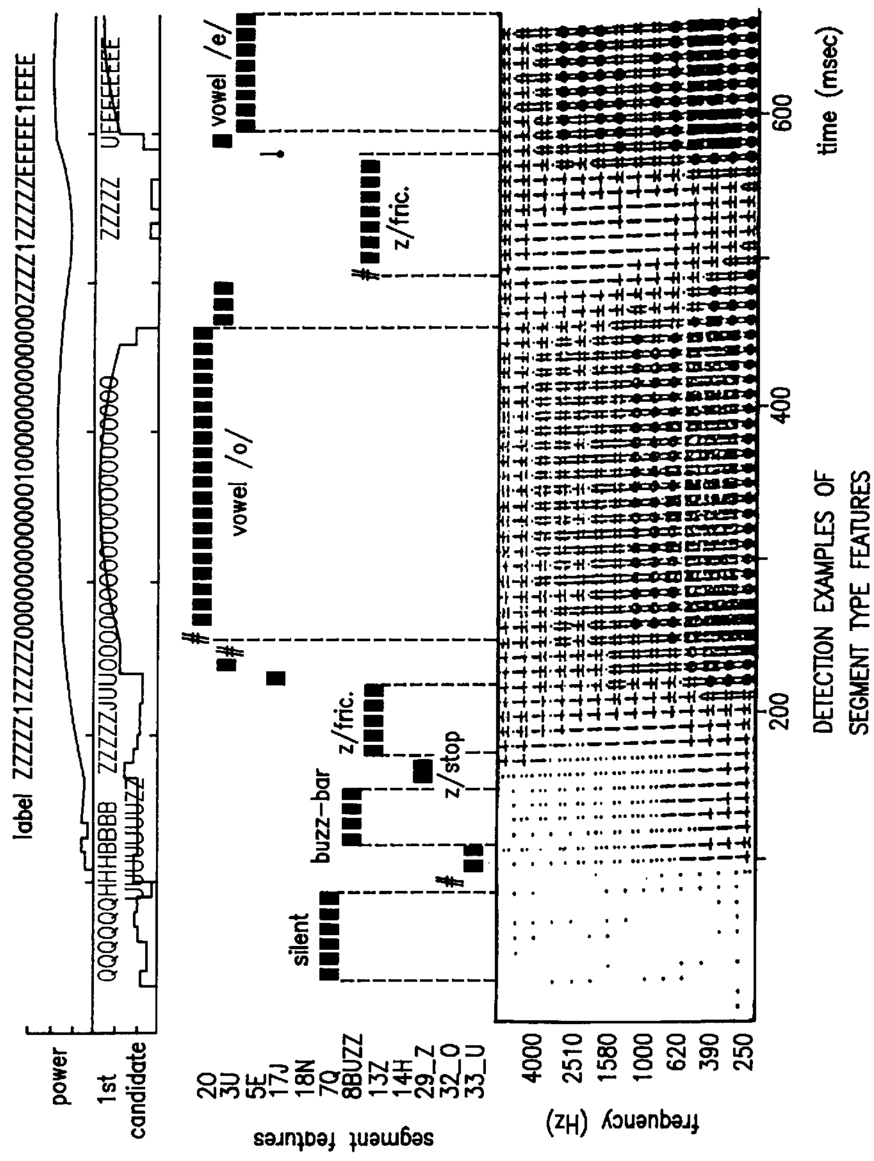
FIG. 25 shows a schematic diagram of an example of the detection of segment type features.

The diagram of the above-explained detection method for the segment type features is shown in FIG. 24.

In an experiment according to this method, speech data is a set of 212 words each of which was obtained by recording voices uttered by 10 to 40 adult male and female speakers in a sound-proof room. By visually observing the data for every word, a central frame of each segment type feature was decided and a reference pattern was designed using the central frame and pairs of 2 frames before and after it, i.e., total 5 frames. The number of samples for each of the segment type features is shown in Table 6.

Detection examples of the segment type features by the first method noted above for calculating the posteriori probability were indicated in shading of the posteriori probabilities of the respective segment type features. Table 6 is a detection example of the word "Zouzei (tax increase)" (zo:ze:/). While /z/ at the word head is grasped by three features of buzz—z/stop—z/fric., only the feature of z/fric. is outputted for /z/ in the word middle. This agrees with the observed result of the logarithmic spectrum shown in a lower part of Table 6. Use of the second method for calculating the posteriori probability also provides substantially similar results. While the posteriori probability takes a binary value in case of the first method, there are found in case of the second method, such features that the probability value is changed slowly and a plurality of candidates are easily outputted for one segment.

In order to evaluate the detection method for segment type features, a preliminary recognition experiment was conducted. Of the speech data used for designing the standard patterns, the experiment was made on the set of 212 words uttered by the 5 male speakers using the first method for calculating the posteriori probability.

The overall recognition score was 65.7% (5461/8318). Of the results, the recognition scores for several segments are shown in Table 7 in the form of an indiscrimination score table. As a whole, the segments of liquid and nasal are superior in the recognition score to other segments. In particular, the explosives added to vowels were recognized satisfactorily and the recognition score of the voiceless explosive reached 89.9%. Although the voiced explosive tends to be indiscriminately recognized as the voiceless explosive, an improvement in the recognition score is expected in case of recognizing the voiced explosive as a phoneme combined with the buzz, because the buzz is recognized as one segment.

TABLE 6

Sample Numbers of Segment Type Features

| 1<br>番号 | 2<br>記号 | 3<br>サンプル数 |
|---|---|---|
| 1 | a | 2542 |
| 2 | o | 2669 |
| 3 | u | 2029 |
| 4 | i | 2540 |
| 5 | e | 1529 |
| 6 | — | 210 |
| 7 | Q | 2107 |
| 8 | B | 1215 |
| 9 | = | 1455 |
| 10 | M | 843 |
| 11 | N | 558 |
| 12 | r | 809 |
| 13 | z | 660 |
| 14 | h | 581 |
| 15 | s | 1368 |
| 16 | e | 613 |
| 17 | j | 347 |
| 18 | w | 229 |
| 19 | b | 533 |
| 20 | d | 461 |
| 21 | g | 279 |
| 22 | R | 474 |
| 23 | * | 1438 |
| 24 | m | 873 |
| 25 | n | 576 |
| 26 | p | 167 |
| 27 | t | 575 |
| 28 | k | 1850 |
| 29 | Z | 765 |
| 30 | C | 623 |
| 31 | A | 410 |
| 32 | O | 413 |
| 33 | U | 294 |
| 34 | I | 1049 |
| 35 | E | 176 |

1: No.
2: symbol
number of samples

TABLE 7

Misdiscrimination Table of Segment Type Features

| | OUT | | | | | | | |
|---|---|---|---|---|---|---|---|---|
| IN | b | d | g | p | t | k | others | total |
| b | 93 | 11 | 3 | 7 | 1 | 0 | 22 | 137 |
| d | 5 | 91 | 2 | 0 | 6 | 1 | 13 | 118 |
| g | 2 | 1 | 23 | 2 | 1 | 17 | 3 | 49 |
| p | 0 | 0 | 0 | 33 | 1 | 1 | 2 | 37 |
| t | 0 | 0 | 0 | 4 | 128 | 6 | 6 | 144 |
| k | 0 | 0 | 8 | 2 | 5 | 426 | 31 | 472 |

voiced stop 68.1% (207/304)
unvoiced stop 89.9% (587/653)

TABLE 7-continued

Misdiscrimination Table of Segment Type Features

| IN | OUT a | o | u | i | e | others | total |
|---|---|---|---|---|---|---|---|
| a | 543 | 40 | 0 | 0 | 0 | 86 | 669 |
| o | 9 | 542 | 15 | 0 | 8 | 122 | 696 |
| u | 0 | 11 | 284 | 12 | 5 | 211 | 523 |
| i | 0 | 0 | 4 | 506 | 16 | 116 | 642 |
| e | 1 | 1 | 22 | 7 | 314 | 54 | 399 |

vowel 74.7% (2189/2929)

| IN | OUT h | s | c | others | total |
|---|---|---|---|---|---|
| h | 123 | 7 | 0 | 17 | 147 |
| s | 5 | 317 | 16 | 20 | 358 |
| c | 0 | 32 | 114 | 12 | 158 |

fricative 83.6% (554/663)

Returning to FIG. 1A, in the recognition processes for the vowels in step S6 and the other phonemes in step S10, the output results have already converged at a range of "0" to "1". In this case, the greater the output, the more likely the phoneme is of the type to be designated by such a step. On the contrary, in the recognition process for the semivowels at step S8, since a Maharanobis distance is used at the time of recognition, the less the output result, the more likely the phoneme is of the type to be designated by such a step. The output values also converge at a range of about "0" to plus several. In order to normalize in step S9, at first the maximal value of the output is made to be "0" by marking a minus sign to the output value. Subsequently, a threshold th (<0) is set and output values less than or equal to th are replaced with th in order to make the range of the value from th to "0". In addition, a linear transformation is performed so that the output values become th→"0" and "0"→"1", and the results obtained are used as the normalized output.

The above described process at each step is repeated until the speech block recognition process is completed and the process is advanced to step S12 where it is terminated.

In step S12, the preliminary selection of words is performed based on the results of rough segmentation in step S1. In concrete terms, the process is that only words which are coincident with the rows of three kinds of segments obtained by the segmentation are selected from the word dictionary. The words in the word dictionary selected at step S12 are read one by one in step S13, and whether all the selected words are matched or not is determined in step S14. If the operation is not terminated, the score calculating is performed according to DP in step S15. This DP directly matches the row of phoneme standard patterns corresponding to the row of phoneme symbols obtained from the word dictionary with the parameter time series of input speech. The score d(i, j) at the frame j and the phoneme class Ci is calculated using the values obtained at each step S7, 9 and 11 as they are. The equations of this DP is expressed as follows:

$$g(i,0) = -\infty$$
$$g(0,j) = -\infty$$
$$g(1,1) = d(1,1)$$
$$g(1,j) = d(1,j) + g(1,0-1)$$

-continued $$g(i,j) = d(i,j) + max\begin{cases} g(i,j-1) & \text{(a)} \\ g(i-1,j-1) & \text{(b)} \\ g(i-2,j-1) & \text{(c)} \end{cases}$$
$$(i \geqq 3)$$

$$D(A,X) = g(I,J)/I + J$$

[$A$, dictionary; $X$, input work; $g$ $(i,j)$, accumulated score at $(i,j)$; $I$ and $J$, maximal value of $i$ and $j$]

When the dictionary is terminated according to the determination at step S14, the process is advanced to step S16. The word to be given the maximal score is selected from the matched words and is used as the recognition result of input speech. This recognition result is output in step S17.

FIG. 2 is a block diagram showing the hardware structure of this apparatus. As shown in this figure, the speech input from a microphone 18 is analyzed by a group of band-pass filters at an analyzing unit 19 and is converted into a short time spectrum. A central processing unit ("CPU") 20 controls the processing procedure shown in FIG. 1 and this program is stored in a ROM1 21. A ROM2 22 is used as a word dictionary. A RAM 23 is used for storing the phoneme pattern and stores the data sent from a floppy disk device 24 or the ROM 22. The reason why the phoneme patterns are stored in the RAM is that the phoneme pattern can be adapted to a specific person by learning the vowels. In this case, the contents of the RAM are rewritten and the vowel pattern is registered.

In this embodiment, although the recognizing method using the same parameter is described as one example, the method using different parameters according to groups of phonemes is also considered. In this case, since the kind of phoneme can not be determined at the step of rough segmentation, the parameter can not be selected. However, the kind of phoneme is determined by the process of the step S5 shown in FIG. 1A, and a different parameter can be used after analyzing the input speech again by a different method.

In such a case, a band-pass filter is similarly used in the step S10 and a parameter of the LPC type, in which the peak is well expressed, is used in the steps S6 and S8.

In these embodiments, since various parameters are used, the analysis is performed by software. As a result, the structure of the hardware can be simplified. Therefore, the analyzing unit 19 shown in FIG. 2 is not required to analyze the input speech but performs A/D conversion and only takes them into the bus.

Although the present invention is explained referring to the preferred embodiment as above described, the present invention is not limited to the above described embodiment and various modifications can be made within the scope of the following claims.

As above explained, the speech recognition with high accuracy can be made according to the present invention, since the different parameters and methods of recognition are used according to the kind of phoneme, and dynamic programming is applied for positioning the phoneme pattern corresponding to the input speech after rough segmentation. Furthermore, speech recognition resistant to unspecified speakers can be made by learning the phonemes in which individual differences are strongly revealed, such as vowels.

What is claimed is:

1. A method for speech recognition, comprising the steps of:

inputting speech, which is to be recognized, into a speech recognition apparatus;

performing a segmentation operation which classifies the input speech into segments, each segment including phonemes;

determining the kinds of classes of phonemes in the input speech by referring to the segmentation operation;

applying only one recognition method to each class of phonemes determined in said determining step, wherein different recognition methods are to be applied to different classes of phonemes;

recognizing phonemes in each segment by using the selected one recognition method, and obtaining values of each phoneme as the recognition results;

converting all the values for the segments into values in a predetermined range;

selecting words from a dictionary which are coincident with a sequence of the recognized phonemes;

calculating a score by summing up the values of phonemes of each selected word; and outputting a word with a maximum score calculated in the calculating step as a recognition result of the input speech.

2. A method for speech recognition according to claim 1, wherein said determining step determines the recognition method in accordance with each kind of phoneme in each segment.

3. A method for speech recognition according to claim 1, wherein said selecting step selects words in accordance with each segment of the words stored in the dictionary.

4. A method for speech recognition according to claim 1, further comprising the step of matching the input speech with the selected words, wherein said matching step matches each segment of the input speech with the segments of the selected words.

5. A method for speech recognition according to claim 1, wherein said recognizing step is performed by a central processing unit.

6. A method for speech recognition according to claim 1, wherein said selecting step selects words from the dictionary in which the phonemes of the words in the dictionary are stored in accordance with a segmentation operation which classifies each phoneme of the words stored in the dictionary wherein said method further comprises the steps of:

matching the input speech with the selected words using normalized values; and outputting the result of said matching step.

7. A method for speech recognition according to claim 1, further comprising the step of transmitting the segments to a recognition device for recognizing phonemes by using the applied recognition methods.

8. An apparatus for speech recognition, comprising:

inputting means for inputting speech, which is to be recognized;

performing means for performing a segmentation operation which classifies the input speech into segments, each segment including phonemes;

determining means for determining the kinds of classes of phonemes in the input speech by referring to the segmentation operation;

applying means for applying only one recognition method to each class of phonemes determined by said determining means, wherein said applying means applies different recognition methods to different classes of phonemes;

recognizing means for recognizing phonemes by using the applied only one recognition method, and for obtaining values of each phoneme as the recognition results;

converting means for converting all the values for the segments into values in a predetermined range;

selecting means for selecting words from a dictionary which are coincident with a sequence of the recognized phonemes;

calculating means for calculating a score by summing up the values of phonemes of each selected word; and outputting means for outputting a word with a maximum score calculated by said calculating means as a recognition result of the input speech.

9. An apparatus for speech recognition according to claim 8, wherein each segment comprises at least one phoneme, wherein said apparatus further comprises means for determining the kind of each phoneme, and wherein said determining means determines the recognition method in accordance with each kind of phoneme in each segment.

10. An apparatus for speech recognition according to claim 8, wherein said selecting means selects words in accordance with each segment of the words stored in the word dictionary.

11. An apparatus for speech recognition according to claim 8, further comprising means for matching of the input speech with the selected words, wherein said matching means matches each segment of the input speech with segments of the selected words.

12. An apparatus for speech recognition according to claim 8, wherein said recognition means comprises a central processing unit.

13. An apparatus for speech recognition according to claim 8, wherein said selecting means selects words from the dictionary in which the phoneme of words in the dictionary are stored in accordance with a segmentation operation which classifies each phoneme of the words in the dictionary, wherein said apparatus further comprises:

matching means for matching the input speech with the selected words using converted values; and outputting means for outputting the result of matching by said matching means.

14. An apparatus for speech recognition according to claim 8, further comprising:

transmitting means for transmitting the segments to said recognizing means for recognizing phonemes by using the applied recognition methods.

15. A computer program product comprising a computer usable medium having computer readable program code means embodied in the medium for speech recognition by a computer comprising a speech recognition apparatus, said product including:

first computer readable program code means for causing a computer to input speech, which is to be recognized, into the speech recognition apparatus;

second computer readable program code means for causing the computer to perform a segmentation operation which classifies the input speech into segments, each segment including phonemes;

third computer readable program code means for causing the computer to determine the kinds of classes of phonemes in the input speech by referring to the segmentation operation;

fourth computer readable program code means for causing the computer to apply only one recognition method to each class of phoneme caused to be determined by said third computer readable program means, wherein said fourth computer readable program code means causes the computer to apply different recognition methods to different classes of phonemes;

fifth computer readable program code means for causing the computer to recognize phonemes in each segment by using the applied only one recognition method, and obtaining values of each phoneme as the recognition results;

sixth computer readable program code means for causing the computer to convert the values for the segments into values of a predetermined range;

seventh computer readable program code means for causing the computer to select words from a dictionary which are coincident with a sequence of the recognized phonemes:

eighth computer readable program code means for causing the computer to calculate a score by summing up the values of phonemes of each selected word; and ninth computer readable program code means for causing the computer to output a word with a maximum score caused to be calculated by said eighth computer readable program code means as a recognition result of the input speech.

* * * * *

UNITED STATES PATENT AND TRADEMARK OFFICE

CERTIFICATE OF CORRECTION

PATENT NO. : 5,893,058

DATED : April 6, 1999

INVENTOR(S) : TETSUO KOSAKA

It is certified that error appears in the above-identified patent and that said Letters Patent is hereby corrected as shown below:

ON THE COVER PAGE

AT [56], References Cited, Other Publications

Insert --ICASSP 84, IEEE International Conference on Acoustics, Speech, and Signal Processing, "A Speaker Independent Word Recognition System Based on Phoneme Recognition for a Large Size (212 words) Vocabulary", Makino, et al., San Diego, CA, March 19-21, 1984, Vol. 2, pp. 17.8.1-4.--.

COLUMN 3,

Line 3, "diagram" should read --diagram of--.

COLUMN 10

Line 65, "consisted" should read --consisting--.

COLUMN 11

Line 41, "ceeds" should read --ceed--.

UNITED STATES PATENT AND TRADEMARK OFFICE
CERTIFICATE OF CORRECTION

PATENT NO. : 5,893,058

DATED : April 6, 1999

INVENTOR(S) : TETSUO KOSAKA

It is certified that error appears in the above-identified patent and that said Letters Patent is hereby corrected as shown below:

COLUMN 12
Line 7, "pattern" should read --pattern |P--.
Line 55, "of n" should read --of $\eta$--.

COLUMN 15
Line 44, "a" should read --an--.
Line 55, "$\frac{m^2_{ij}}{\delta_j^2}$" should read --$\frac{m_{ij}^2}{\delta_j^2}$--.

Line 62, "$s_j(t)=$" should read --$s_i(t)=$ --, and "$m^2_{ij}$" should read --$m_{ij}^2$--.

COLUMN 16,
Line 22, "an" (second occurrence) should read --a--.

COLUMN 17
Line 47, "the-recognition" should read --the recognition--.

COLUMN 18
Line 23, "Maharanobis'" should read --Mahalanobis'--.
Line 57, "$\exp\{-\alpha(x_j^{(a)} - x_j^{(a)})^T(V_j^{(a)})^{-1}(x_j^{(a)} - x_j^{(a)})\}$" should read --$\exp\{-\alpha(x_j^{(a)} - x_j^{-(a)})^T(V_j^{(a)})^{-1}(x_j^{(a)} - x_j^{-(a)})\}$--.

UNITED STATES PATENT AND TRADEMARK OFFICE

CERTIFICATE OF CORRECTION

PATENT NO. : 5,893,058

DATED : April 6, 1999

INVENTOR(S) : TETSUO KOSAKA

It is certified that error appears in the above-identified patent and that said Letters Patent is hereby corrected as shown below:

COLUMN 19

Line 29, "$\alpha(a_{i(k)} - x_{j(k)}^{(a)})T(V_{j(k)}^{(a)})^{-1}$" should read --$\alpha(a_{i(k)} - x_{j(k)}^{-(a)})^{T}(V_{j(k)}^{(a)})^{-1}$--.

Line 30, "$(a_{i(k)} - x_{j(k)}^{(a)})$" should read --$(a_{i(k)} - x_{j(k)}^{-(a)})$--.

Line 65, "victors" should read --vectors--.

COLUMN 20

Line 53, "stored" should read --store--.

Line 58, "in" should read --is--.

COLUMN 21

Line 21, "sons" should read --son--.

COLUMN 22

Line 30, "$E^{(n)} = (E_o^{(n)}, E_{(k)}^{(n)}, \ldots, E_{19}^{(n)})^T$, should read --$E^{(n)} = (E_o^{(n)}, E_1^{(n)}, \ldots, E_k^{(n)}, \ldots E_{19}^{(n)})^T$,--.

Line 44, "$\hat{S}$" should be delete.

COLUMN 23

Line 3, "Mahalanbois'" should read --Mahalanobis'--.

Line 10, "2(a)," should read --20(a),--.

Line 12, "đ" should read --⊚--.

COLUMN 25

Line 31, "for" should read --For--.

UNITED STATES PATENT AND TRADEMARK OFFICE

CERTIFICATE OF CORRECTION

PATENT NO. : 5,893,058

DATED : April 6, 1999

INVENTOR(S) : TETSUO KOSAKA

It is certified that error appears in the above-identified patent and that said Letters Patent is hereby corrected as shown below:

COLUMN 30
Line 41, "pre-processing" should read --pre-processing.--

COLUMN 31
Line 67, "features" should read --feature--.

COLUMN 32
Line 49, after "classes)" start a new line.

COLUMN 34
Line 29, 16 e 613" should read --16 c 613--.

COLUMN 35
Line 29, "Maharanobis" should read --Mahalanobis--.
Line 60, "is" should read --are--.

COLUMN 37
Line 39, "dictionary" should read --dictionary,--.

COLUMN 39
Line 10, "phonemes:" should read --phonemes;--.

Signed and Sealed this

Seventh Day of December, 1999

Attest:

Q. TODD DICKINSON

Attesting Officer

*Acting Commissioner of Patents and Trademarks*